United States Patent
Hidalgo et al.

(10) Patent No.: US 10,883,539 B1
(45) Date of Patent: Jan. 5, 2021

(54) ANTI-ROTATION SQUEEZE FILM DAMPER BEARING ASSEMBLY

(71) Applicant: HONEYWELL INTERNATIONAL INC., Morris Plains, NJ (US)

(72) Inventors: Mario Alejandro Hidalgo, Phoenix, AZ (US); Paul B. Talbert, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/688,288

(22) Filed: Nov. 19, 2019

(51) Int. Cl.
*F16C 27/04* (2006.01)
*F01D 25/16* (2006.01)

(52) U.S. Cl.
CPC .......... *F16C 27/045* (2013.01); *F01D 25/164* (2013.01); *F05D 2240/54* (2013.01); *F05D 2260/96* (2013.01); *F16C 2360/23* (2013.01)

(58) Field of Classification Search
CPC .. F16C 27/045; F16C 2360/23; F01D 25/162; F01D 25/164
See application file for complete search history.

(56) References Cited

U.S. PATENT DOCUMENTS

| | | | |
|---|---|---|---|
| 5,564,903 A * | 10/1996 | Eccles | F01D 25/164 416/174 |
| 5,651,553 A | 7/1997 | Ishida et al. | |
| 9,926,975 B2 * | 3/2018 | Smedresman | F01D 25/164 |
| 9,933,012 B1 * | 4/2018 | Grillo | F16C 27/04 |
| 2002/0067871 A1 * | 6/2002 | Bos | F16C 27/045 384/99 |
| 2009/0110572 A1 * | 4/2009 | Meacham | F02C 6/12 417/406 |
| 2016/0281536 A1 | 9/2016 | Anglin et al. | |

FOREIGN PATENT DOCUMENTS

CN 102425639 A 4/2012

* cited by examiner

*Primary Examiner* — Phillip A Johnson
(74) *Attorney, Agent, or Firm* — Lorenz & Kopf, LLP

(57) ABSTRACT

A squeeze film damper bearing assembly includes a bearing and a spring cage that receives and surrounds the bearing. The spring cage has an inner diameter and an outer diameter. The outer diameter has an outer surface that defines a first circumferential channel recessed within the outer surface that is axially spaced apart from a second circumferential channel recessed within the outer surface and at least one axial anti-rotation chamber that interconnects the first and second channels. The assembly includes a first piston ring received in the first channel and a second piston ring received in the second channel. The assembly includes at least one anti-rotation member received within the at least one axial anti-rotation chamber that cooperates with the first piston ring and the second piston ring to inhibit a rotation of the first piston ring and the second piston ring relative to the outer surface.

20 Claims, 15 Drawing Sheets

ANTI-ROTATION SQUEEZE FILM DAMPER BEARING ASSEMBLY

TECHNICAL FIELD

The present disclosure generally relates to gas turbine engines, and more particularly relates to a squeeze film damper assembly, which inhibits a rotation of at least one piston ring associated with the squeeze film damper assembly.

BACKGROUND

Gas turbine engines may be employed to power various devices. For example, a gas turbine engine may be employed to power a vehicle, such as an aircraft. Generally, gas turbine engines include one or more compressors or turbines, which are supported on rotatable shafts. One or more bearings may be associated with the rotatable shafts, to ensure smooth rotation of the associated shaft, for example. The bearing may include a squeeze film damper to reduce vibrations and aid in system dynamics. In certain instances, unsecured portions of the squeeze film damper assembly may undesirably rotate, due to the position of the squeeze film damper relative to the rotatable shaft as a result of engine dynamics or vibrations, which may result in wear on a portion of the components associated with the squeeze film damper and may result in a loss of oil pressure.

Accordingly, it is desirable to provide a squeeze film damper bearing assembly for a gas turbine engine, which inhibits a rotation of portions of the squeeze film damper assembly and thereby inhibits wear on components of the squeeze film damper bearing assembly. In addition, it is desirable to provide a squeeze film damper assembly, which maintains oil pressure throughout the rotation of the rotatable shaft. Furthermore, other desirable features and characteristics of the present disclosure will become apparent from the subsequent detailed description and the appended claims, taken in conjunction with the accompanying drawings and the foregoing technical field and background.

SUMMARY

According to various embodiments, provided is a squeeze film damper bearing assembly. The squeeze film damper bearing assembly includes a bearing and a spring cage that receives and surrounds the bearing. The spring cage has an inner diameter and an opposite outer diameter. The bearing is adjacent to the inner diameter. The outer diameter has an outer surface that defines a first circumferential channel recessed within the outer surface that is axially spaced apart from a second circumferential channel recessed within the outer surface and at least one axial anti-rotation chamber that interconnects the first channel and the second channel. The squeeze film damper bearing assembly includes a first piston ring received in the first channel and a second piston ring received in the second channel. The squeeze film damper bearing assembly includes at least one anti-rotation member received within the at least one axial anti-rotation chamber that cooperates with the first piston ring and the second piston ring to inhibit a rotation of the first piston ring and the second piston ring relative to the outer surface.

The at least one anti-rotation member is a pin received within the at least one axial anti-rotation chamber that cooperates with at least one notch defined in each of the first piston ring and the second piston ring to inhibit the rotation of the first piston ring and the second piston ring relative to the outer surface. The first piston ring includes a split line that defines opposed ends of the first piston ring, and the at least one notch comprises a pair of notches, each defined at a respective one of the opposed ends. A portion of the anti-rotation chamber is defined beneath a surface of each of the first circumferential channel and the second circumferential channel. The squeeze film damper bearing assembly extends along a longitudinal axis and the at least one axial anti-rotation chamber is parallel to the longitudinal axis. The bearing further comprises an outer ring, and a mounting flange coupled to the outer ring by a plurality of fingers. The plurality of fingers is arranged in at least one group, and the at least one axial anti-rotation chamber is defined so as to be circumferentially offset from the at least one group. The at least one anti-rotation member is an axial bar coupled to the first piston ring and the second piston ring that is received within the at least one axial anti-rotation chamber to inhibit the rotation of the first piston ring and the second piston ring relative to the outer surface. The axial bar is received within the at least one axial anti-rotation chamber so as to be positioned a distance below the outer surface. The first piston ring and the second piston ring each include a split line that defines opposed ends of the first piston ring and the second piston ring, and the axial bar is coupled to the first piston ring and the second piston ring so as to be circumferentially opposite of the opposed ends.

Further provided according to various embodiments is a squeeze film damper bearing assembly that includes a bearing and a spring cage that receives and surrounds the bearing. The spring cage has an inner diameter and an opposite outer diameter. The bearing is coupled to the inner diameter. The outer diameter has an outer surface that defines a first circumferential channel recessed within the outer surface that is axially spaced apart from a second circumferential channel recessed within the outer surface and a first radial anti-rotation chamber defined in the first channel. The squeeze film damper bearing assembly includes a first piston ring received in the first channel. The first piston ring has a first notch defined to face the first channel. The squeeze film damper bearing assembly includes a second piston ring received in the second channel. The squeeze film damper bearing assembly includes at least one anti-rotation member received within the first radial anti-rotation chamber that cooperates with the first notch to inhibit a rotation of the first piston ring relative to the outer surface.

The at least one anti-rotation member is a first pin received within the first radial anti-rotation chamber. The squeeze film damper bearing assembly includes a second radial anti-rotation chamber defined in the second channel and a second notch defined in the second piston ring to face the second channel. The at least one anti-rotation member further comprises a second pin received within the second radial anti-rotation chamber that cooperates with the second notch to inhibit the rotation of the second piston ring relative to the outer surface. The first piston ring and the second piston ring each include a split line that defines opposed ends of the first piston ring and the second piston ring, and the first notch and the second notch comprises a pair of notches, each defined at a respective one of the opposed ends. A portion of the first radial anti-rotation chamber is defined beneath a surface of the first circumferential channel. The squeeze film damper bearing assembly extends along a longitudinal axis and the first radial anti-rotation chamber is perpendicular to the longitudinal axis.

Also provided according to various embodiments is a squeeze film damper bearing assembly that includes a bearing. The squeeze film damper bearing assembly also includes a spring cage that receives and surrounds the bearing. The spring cage has an inner diameter and an opposite outer diameter. The bearing is coupled to the inner diameter. The outer diameter has an outer surface that defines a first circumferential channel recessed within the outer surface that is axially spaced apart from a second circumferential channel recessed within the outer surface and at least one axial anti-rotation chamber that interconnects the first channel and the second channel. The squeeze film damper bearing assembly includes a first piston ring received in the first channel and a second piston ring received in the second channel. The squeeze film damper bearing assembly includes at least one anti-rotation member received within the at least one axial anti-rotation chamber that cooperates with the first piston ring and the second piston ring to inhibit a rotation of the first piston ring and the second piston ring relative to the outer surface. The squeeze film damper bearing assembly includes a mounting flange coupled to the spring cage by a plurality of fingers. The plurality of fingers is arranged in at least one group, with the at least one axial anti-rotation chamber defined so as to be circumferentially offset from the at least one group. The squeeze film damper bearing assembly extends along a longitudinal axis and the at least one axial anti-rotation chamber is parallel to the longitudinal axis.

The at least one anti-rotation member is a pin received within the at least one axial anti-rotation chamber that cooperates with at least one notch defined in each of the first piston ring and the second piston ring to inhibit the rotation of the first piston ring and the second piston ring relative to the outer surface. The first piston ring includes a split line that defines opposed ends of the first piston ring, and the at least one notch comprises a pair of notches, each defined at a respective one of the opposed ends.

The at least one anti-rotation member is an axial bar coupled to the first piston ring and the second piston ring that is received within the at least one axial anti-rotation chamber to inhibit the rotation of the first piston ring and the second piston ring relative to the outer surface.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
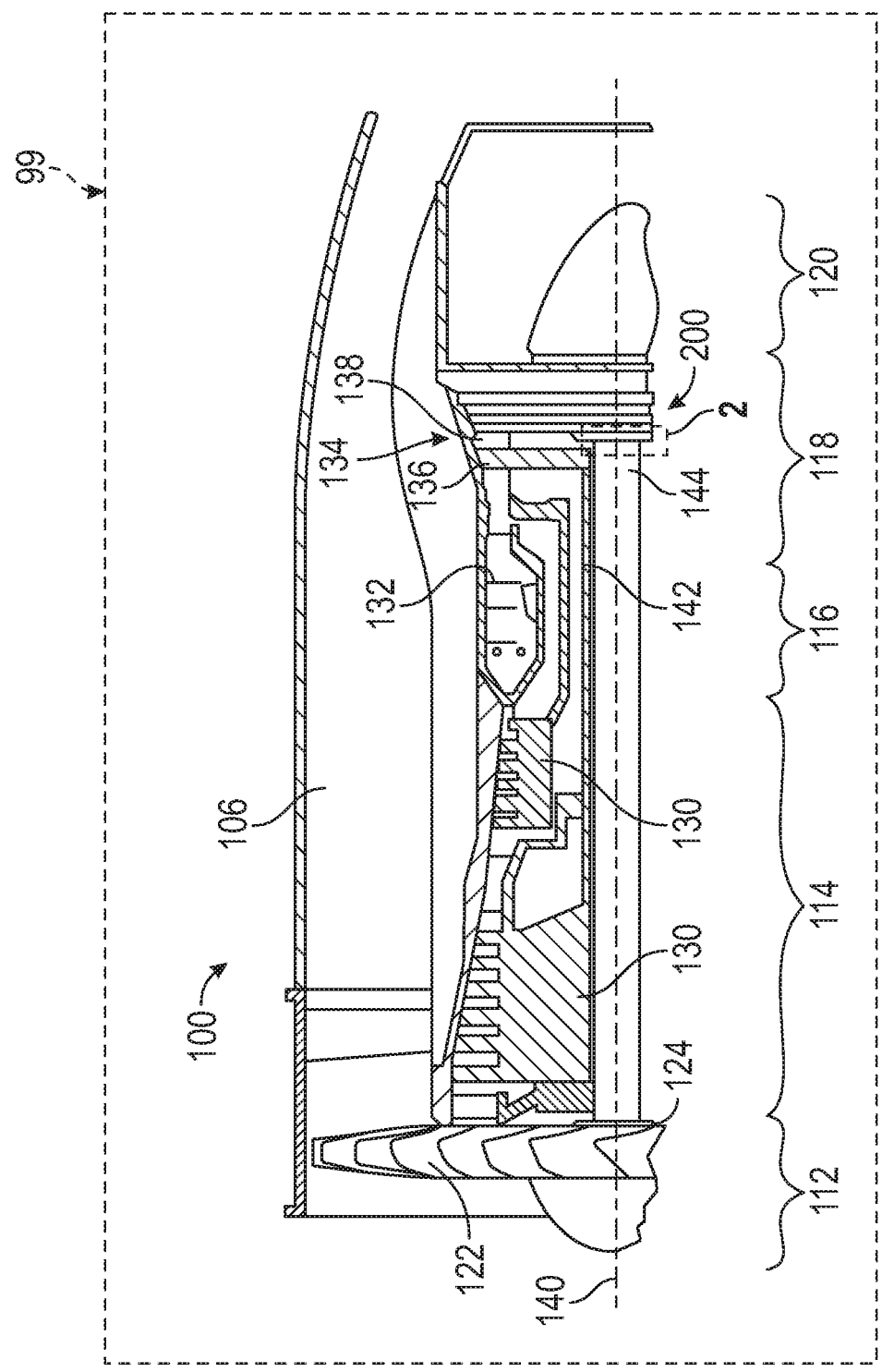
FIG. 1 is a schematic cross-sectional illustration of a gas turbine engine, which includes a squeeze film damper bearing assembly in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of system that would benefit from having an anti-rotation squeeze film damper bearing assembly or from the anti-rotation methods described herein, and the gas turbine engine described herein is merely one exemplary embodiment according to the present disclosure. In addition, while the anti-rotation squeeze film damper bearing assembly is described herein as being used with a gas turbine engine used for propulsion or power generation onboard a vehicle, such as a bus, motorcycle, train, motor vehicle, marine vessel, aircraft, rotorcraft and the like, the various teachings of the present disclosure can be used with a gas turbine engine on a stationary platform or for stationary power generation. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "transverse" denotes an axis that crosses another axis at an angle such that the axis and the other axis are neither substantially perpendicular nor substantially parallel.

With reference to FIG. 1, a partial, cross-sectional view of an exemplary gas turbine engine 100 is shown with the remaining portion of the gas turbine engine 100 being substantially axisymmetric about a longitudinal axis 140, which also comprises an axis of rotation for the gas turbine engine 100. In the depicted embodiment, the gas turbine engine 100 is an annular multi-spool turbofan gas turbine jet engine within an aircraft 99, although other arrangements and uses may be provided. As will be discussed herein, the gas turbine engine 100 includes an anti-rotation squeeze film damper bearing assembly or a squeeze film damper bearing assembly 200 that includes an anti-rotation feature. As will be discussed, the squeeze film damper bearing assembly 200 reduces wear on components associated with the squeeze film damper bearing assembly 200, such as a bearing 202 (FIG. 2) and a spring cage 210 (FIG. 2), and also maintains an oil pressure associated with the squeeze film damper bearing assembly 200. The squeeze film damper bearing assembly 200 also cooperates with the bearing 202 (FIG. 2) to reduce vibrations associated with the operation of the gas turbine engine 100, thereby optimizing system dynamics, as will be discussed.

In this example, with continued reference to FIG. 1, the gas turbine engine 100 includes a fan section 112, a compressor section 114, a combustion section 116, a turbine section 118, and an exhaust section 120. In one example, the fan section 112 includes a fan 122 mounted on a rotor 124 that draws air into the gas turbine engine 100 and accelerates it. A fraction of the accelerated air exhausted from the fan 122 is directed through an outer bypass duct 106 and the remaining fraction of air exhausted from the fan 122 is directed into the compressor section 114.

In the embodiment of FIG. 1, the compressor section 114 includes one or more compressors 130. The number of compressors in the compressor section 114 and the configuration thereof may vary. The one or more compressors 130 sequentially raise the pressure of the air and direct a majority of the high pressure air into the combustion section 116. A fraction of the compressed air bypasses the combustion section 116 and is used to cool, among other components, turbine blades in the turbine section 118.

In the embodiment of FIG. 1, in the combustion section 116, which includes a combustion chamber 132, the high pressure air is mixed with fuel, which is combusted. The high-temperature combustion air or combustive gas flow is directed into the turbine section 118. In this example, the turbine section 118 includes one or more turbines 134 disposed in axial flow series. It will be appreciated that the number of turbines, and/or the configurations thereof, may vary. The combustive gas expands through and rotates the turbines 134. The combustive gas flow then exits turbine section 118 for mixture with the cooler bypass airflow from the outer bypass duct 106 and is ultimately discharged from gas turbine engine 100 through exhaust section 120. As the turbines 134 rotate, each drives equipment in the gas turbine engine 100 via concentrically disposed shafts or spools. Generally, the turbines 134 in the turbine section 118, the compressors 130 in the compressor section 114 and the fan 122 are mechanically linked by one or more shafts or spools. For example, in a two spool turbofan engine platform, the turbine rotors contained within a high pressure (HP) turbine stage 136 may be rotationally fixed to the compressors 130 contained within compressor section 114 by an HP shaft 142, while the turbine rotors contained within a low pressure (LP) turbine stage 138 may be rotationally fixed to the rotor 124 of the fan 122 by a coaxial LP shaft 144. In other embodiments, gas turbine engine 100 may be a single spool engine or a multi-spool engine containing more than two coaxial shafts. One or more of the HP shaft and the LP shaft may be supported by the squeeze film damper bearing assembly 200.

Figure 2:
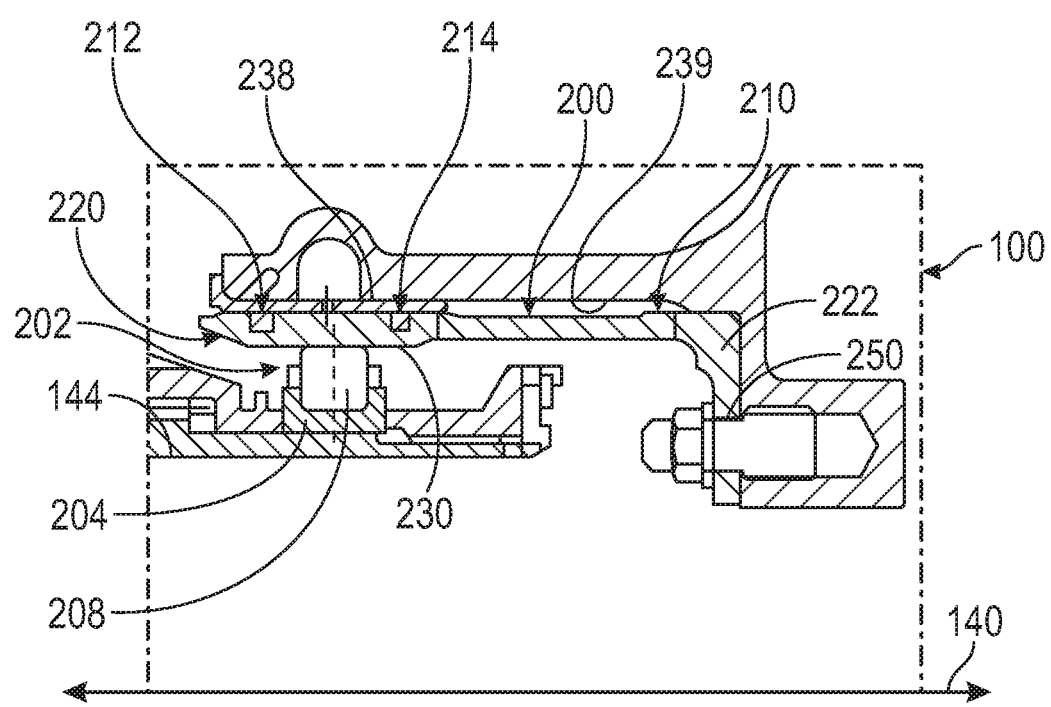
FIG. 2 is a detail cross-sectional view, taken at 2 on FIG. 1, which illustrates the squeeze film damper bearing assembly of FIG. 1 coupled to a rotatable shaft associated with the gas turbine engine, in which a spring cage of the squeeze film damper bearing assembly defines an outer ring of a bearing.
Figure 4:
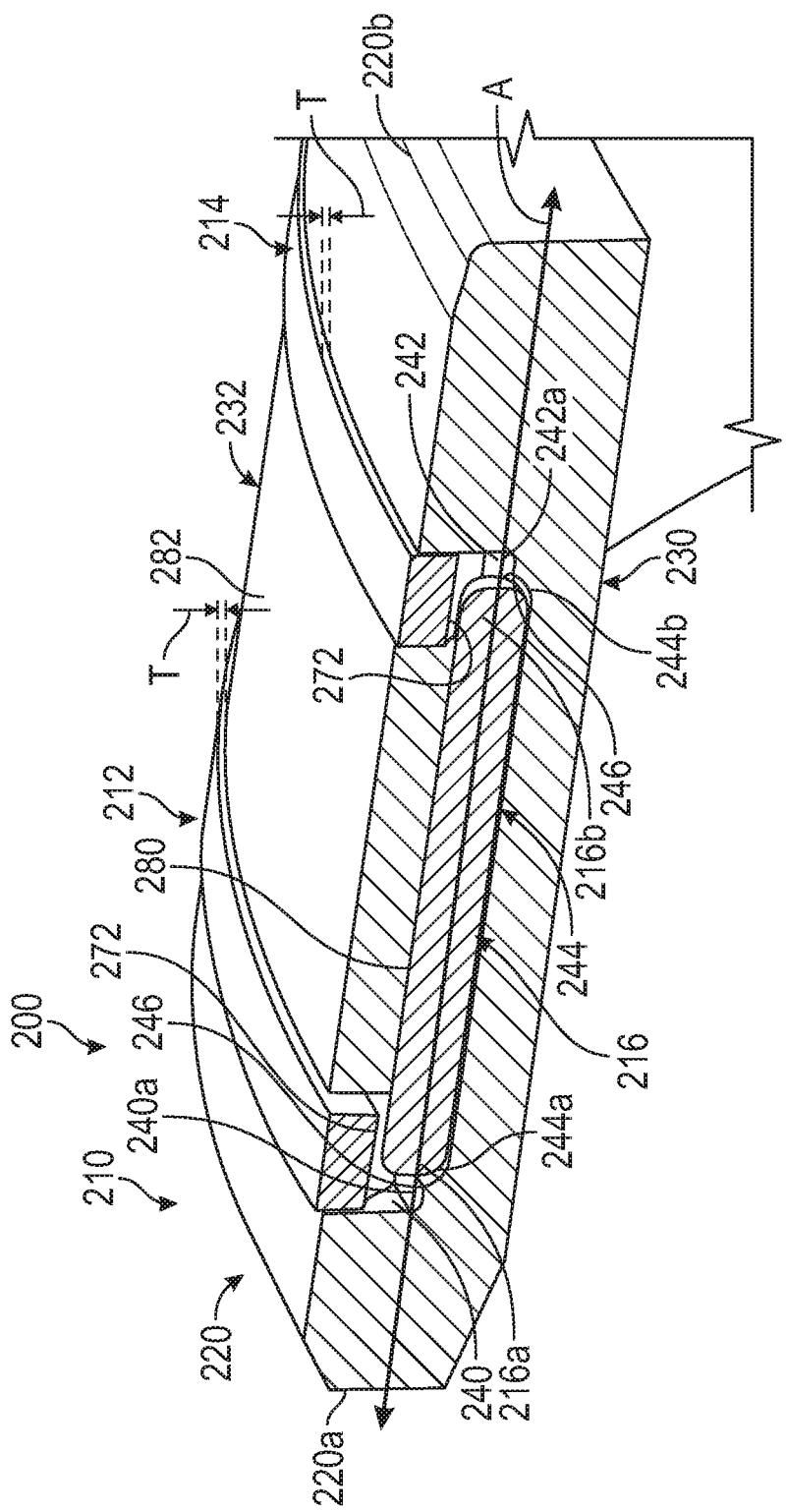
FIG. 4 is a cross-sectional view, taken at line 4-4 of FIG. 3, which illustrates the engagement of an anti-rotation member with a first piston ring and a second piston ring of the squeeze film damper bearing assembly.

With reference to FIG. 2, a cross-sectional detail view of a portion of the gas turbine engine 100 taken at 2 on FIG. 1 is shown. In this example, the squeeze film damper bearing assembly 200 is associated with the LP shaft 144. The squeeze film damper bearing assembly 200 is coaxial with the longitudinal axis 140 and extends along the longitudinal axis 140. The squeeze film damper bearing assembly 200 includes the bearing 202, the spring cage 210, a first piston ring 212, a second piston ring 214 and at least one anti-rotation member 216 (FIG. 4). The bearing 202 comprises any suitable bearing for use with the LP shaft 144, such as a roller element bearing, spherical roller bearing, needle roller bearing, ball bearing, thrust bearing, etc. As the bearing 202 may comprise any suitable bearing 202 for use with the LP shaft 144, the bearing 202 will not be discussed in great detail herein. Briefly, the bearing 202 includes an inner ring 204 and a plurality of rolling elements 208. The inner ring 204 is coaxial with the spring cage 210, which in this example defines an outer ring 220 for the bearing 202. The inner ring 204 is coupled to the LP shaft 144. The plurality of rolling elements 208 are coupled between the inner ring 204 and in this example, the outer ring 220 defined by the spring cage 210. The bearing 202 and the spring cage 210 support the rotation of the LP shaft 144 relative to the squeeze film damper bearing assembly 200 and the surrounding components of the gas turbine engine 100 (FIG. 1).

Figure 2A:
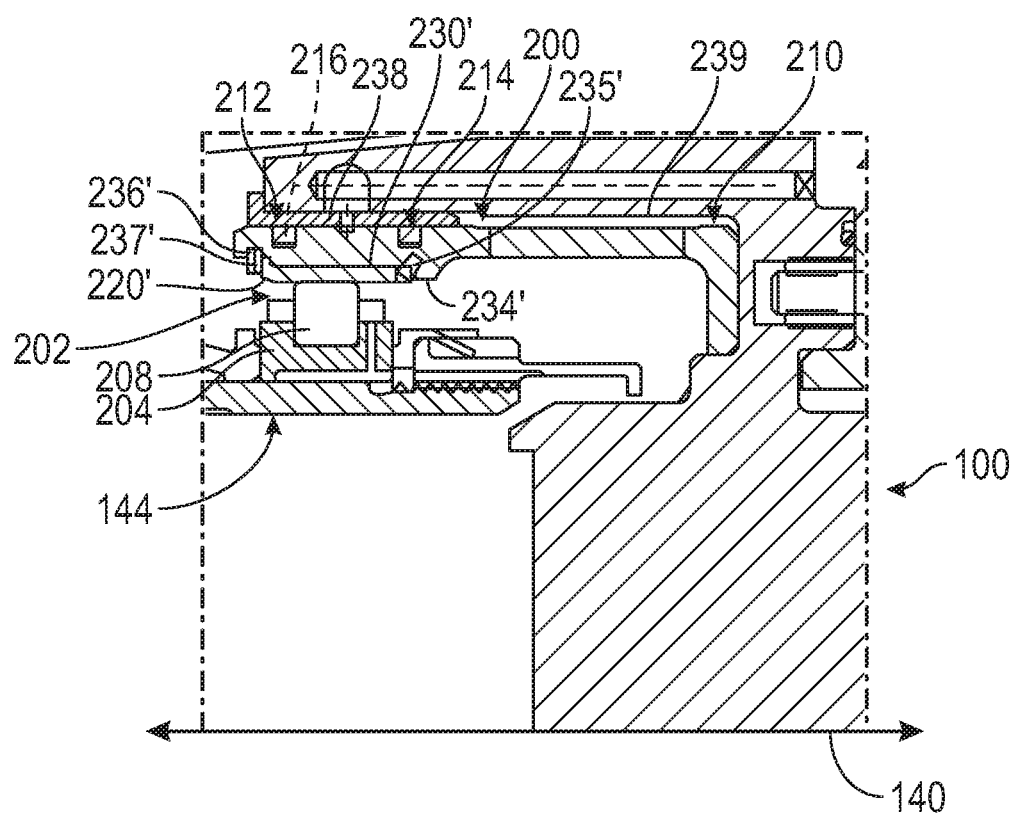
FIG. 2A is a detail cross-sectional view, taken at 2 on FIG. 1, which illustrates the squeeze film damper bearing assembly of FIG. 1 coupled to a rotatable shaft associated with the gas turbine engine, in which an outer ring of the bearing is discrete from the spring cage.

It should be noted, however, with reference to FIG. 2A, that in some embodiments, the outer ring 220 of the bearing 202 may be configured differently. In the example of FIG. 2A, the bearing 202 includes an outer ring 220', which is separate and discrete from the spring cage 210. In the example of FIG. 2A, the inner ring 204 is coaxial with the spring cage 210 and is coupled to the LP shaft 144. The plurality of rolling elements 208 are coupled between the inner ring 204 and the outer ring 220'. In the example of FIG. 2A, an inner diameter surface 230' of the spring cage 210 includes an inward projecting flange 234', which assists in retaining the outer ring 220' within the spring cage 210. A pin 235' may be used to inhibit the rotation of the outer ring 220'. The inner diameter surface 230' of the spring cage 210 also defines a groove 236'. The groove 236' retains a snap-ring 237', which in turn, retains the outer ring 220' within the spring cage 210. The bearing 202 and the spring cage 210 support the rotation of the LP shaft 144 relative to the squeeze film damper bearing assembly 200 and the surrounding components of the gas turbine engine 100. It should be noted that while the first piston ring 212, the second piston ring 214 and the at least one anti-rotation member 216 are described and illustrated herein as being used with a configuration in which the spring cage 210 defines the outer ring 220 of the bearing 202, the first piston ring 212, the second piston ring 214 and the at least one anti-rotation member 216 may also be used in an anti-rotation squeeze film damper assembly in which the outer ring 220' is separate and discrete from the spring cage 210 as shown in FIG. 2A.

Figure 3:
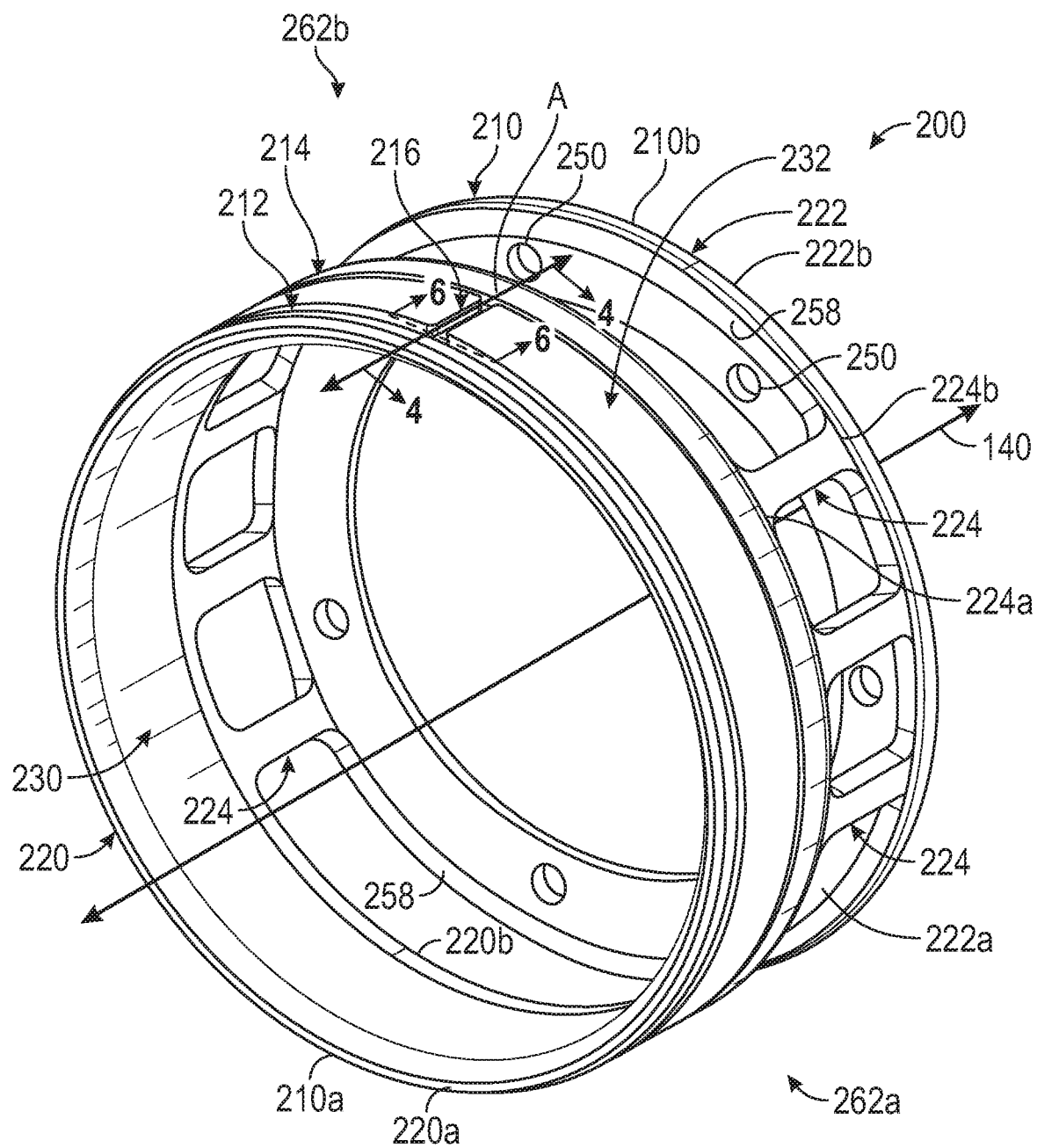
FIG. 3 is a perspective view of the squeeze film damper bearing assembly of FIG. 1, in which an inner ring of the bearing and a plurality of rolling elements are removed for clarity.

With reference to FIG. 3, a perspective view of the squeeze film damper bearing assembly 200 is shown, with the inner ring 204 (FIG. 2) and the plurality of rolling elements 208 (FIG. 2) removed for clarity. The spring cage 210 is annular, and surrounds the plurality of rolling elements 208 (FIG. 2) and the inner ring 204 (FIG. 2). The spring cage 210 is composed of a metal or metal alloy that is suitable for high cycle fatigue loading, including, but not limited to corrosion resistant stainless steel, titanium, etc. The spring cage 210 may be cast, forged, machined, formed through additive manufacturing, etc. The spring cage 210 includes the outer ring 220, a mounting flange 222 and a plurality of fingers 224 that couple or interconnect the outer ring 220 with the mounting flange 222. The outer ring 220 is defined at a first end 210a of the spring cage 210, and the mounting flange 222 is defined at an opposite second end 210b. The outer ring 220 is spaced axially apart from the mounting flange 222 along the longitudinal axis 140 by the fingers 224. The outer ring 220 includes an inner diameter surface 230 and an opposite outer diameter surface 232. The outer ring 220 also includes a first end 220a opposite a second end 220b. The first end 220a of the outer ring 220 defines the first end 210a of the spring cage 210, while the second end 220b is coupled to the plurality of fingers 224.

The inner diameter surface 230 is substantially smooth, and cooperates with the inner ring 204 (FIG. 2) to retain the plurality of rolling elements 208 (FIG. 2). In one example, with reference to FIG. 4, a cross-sectional view of a portion of the squeeze film damper bearing assembly 200 is shown. The outer diameter surface 232 is positioned adjacent to a structure 238 (FIG. 2) of the gas turbine engine 100 (FIG. 2) with enough separation to form an annulus which is filled with a pressurized film of lubrication fluid, such as oil, between the squeeze film damper bearing assembly 200 and the structure 238. In one example, the structure 238 is an L-shaped sleeve, which is positioned between the outer diameter surface 232 and a mounting structure 239 (FIG. 2) of the gas turbine engine 100 (FIG. 2). The outer diameter surface 232 defines a first circumferential or first channel 240, a second circumferential or second channel 242 and at least one anti-rotation chamber 244. The first channel 240 is axially spaced apart from the second channel 242, such that the first channel 240 is proximate the first end 220a, while the second channel 242 is proximate the second end 220b. The first channel 240 and the second channel 242 are substantially U-shaped, and are defined radially inward from the outer diameter surface 232 toward the inner diameter surface 230 such that each of the first channel 240 and the second channel 242 are recessed relative to the outer diameter surface 232. The first channel 240 and the second channel 242 each extend about a perimeter or circumference of the outer diameter surface 232, and in this example, are substantially continuous about the perimeter of the outer diameter surface 232, which is revolved about the longitudinal axis 140 (FIG. 1). The first channel 240 and the second channel 242 are each configured to receive a respective one of the first piston ring 212 and the second piston ring 214. Generally, the first piston ring 212 and the second piston ring 214 are received within the first channel 240 and the second channel 242, respectively, such that a thickness T of the first piston ring 212 and the second piston ring 214 extends above the outer diameter surface 232 to form a seal with the structure 238 (FIG. 2) to contain the lubrication fluid, such as the oil, between the first piston ring 212 and the second piston ring 214. In one example, the thickness T is about 0.006 inches (in.) to about 0.007 inches (in.). The first channel 240 and the second channel 242 are interconnected axially by the anti-rotation chamber 244 such that the first channel 240 and the second channel 242 are in communication via the anti-rotation chamber 244.

In this example, the outer diameter surface 232 defines a single anti-rotation chamber 244. In other embodiments, the outer diameter surface 232 may include a plurality of anti-rotation chambers 244. In this example, the anti-rotation chamber 244 is defined axially between the first channel 240 and the second channel 242. The anti-rotation chamber 244 extends between the first channel 240 and the second channel 242 to receive the anti-rotation member 216 to inhibit a rotation of the first piston ring 212 and the second piston ring 214. The anti-rotation chamber 244 is defined radially inward through the outer diameter surface 232 toward the inner diameter surface 230 and extends between the first channel 240 and the second channel 242. The anti-rotation chamber 244 extends along an axis A, which is substantially parallel to the longitudinal axis 140 (FIG. 1). The anti-rotation chamber 244 has a first chamber end 244a opposite a second chamber end 244b. The first chamber end 244a and the second chamber end 244b may include a lip 246, which may assist in retaining the anti-rotation member 216 within the anti-rotation chamber 244. Stated another way, the anti-rotation chamber 244 may be defined through the first channel 240 and the second channel 242 so as to extend partially below an innermost surface 240a, 242a, respectively, of the first channel 240 and the second channel 242. The anti-rotation chamber 244 is substantially cylindrical, but the anti-rotation chamber 244 may have any desired shape that cooperates with a shape of the anti-rotation member 216. In one example, with brief reference to FIG. 6, the anti-rotation chamber 244 may also be defined with a semi-circular cross-section to cooperate with a shape of the anti-rotation member 216. The anti-rotation chamber 244 may be defined with the forming of the spring cage 210, or may be formed by machining, electrical discharge machining, etc.

With reference back to FIG. 3, the mounting flange 222 couples the squeeze film damper bearing assembly 200 to the gas turbine engine 100 (FIG. 1). In one example, the mounting flange 222 includes a plurality of mounting holes 250, which are spaced apart about a perimeter or circumference of the mounting flange 222. In this example, the mounting flange 222 defines about seven mounting holes 250; however, any number of mounting holes 250 may be employed in any desired pattern about the perimeter. Each of the mounting holes 250 is shaped to receive a suitable mechanical fastener, including, but not limited to a bolt. The mounting holes 250 are defined perpendicular to a surface of a first mounting end 222a of the mounting flange 222, which assists in coupling the mounting flange 222 to the gas turbine engine 100 (FIG. 1). In certain embodiments, the mounting holes 250 may include one or more flats defined adjacent to the mounting holes 250 to facilitate the receipt of the respective mechanical fastener. The mounting flange 222 may also include an axially extending lip 258, which extends about a perimeter or circumference of the mounting flange 222. The first mounting end 222a is opposite a second mounting end 222b. The first mounting end 222a is nearest the axially extending lip 258, which is coupled to the fingers 224, while the second mounting end 222b defines the second end 210b of the spring cage 210. The mounting holes 250 are defined axially through the mounting flange 222 from the first mounting end 222a to the second mounting end 222b.

The fingers 224 interconnect the mounting flange 222 and the outer ring 220. In one example, the spring cage 210 includes six fingers 224, which are clustered in groups 262a, 262b of three about the perimeter or circumference of the spring cage 210. It should be noted that the spring cage 210 need not include the fingers 224, but rather, may be solid or continuous from the outer ring 220 to the mounting flange 222. In other embodiments, the spring cage 210 may include more or less fingers 224, which may or may not be grouped in clusters or sub-groups about the perimeter of the spring cage 210. The fingers 224 are elongated in an axial direction and generally extend parallel to the longitudinal axis 140. Each of the fingers 224 has a first finger end 224a opposite a second finger end 224b. The first finger end 224a of each finger 224 is coupled to or integrally formed with the second end 220b of the outer ring 220, and the second finger end 224b is coupled to or integrally formed with the axially extending lip 258 of the mounting flange 222.

While the fingers 224 are shown herein as being integrally formed or monolithic with the spring cage 210, the outer ring 220 and the mounting flange 222, the fingers 224 may be discrete components that are coupled together via suitable techniques, such as brazing, welding, etc. In addition, the fingers 224 are shown herein with a rectangular or bar shape, however, the fingers 224 may have any desired shape. Generally, the groups 262a, 262b of fingers 224 are positioned at about a 3 o'clock position (between about 75 degrees to about 105 degrees of the circle defined by the perimeter of the mounting flange 222, with zero degrees at the 12 o'clock position, measured clockwise) and a 9 o'clock position (between about 255 degrees to about 285 degrees of the circle defined by the perimeter of the mounting flange 222) about the circumference of the spring cage 210 so as to be on opposed sides, and the anti-rotation chamber 244 is defined at about the 12 o'clock position (between about 345 degrees to about 15 degrees). Thus, the anti-rotation chamber 244 is defined so as to be circumferentially offset from the groups 262a, 262b. It should be noted, however, that the groups 262a, 262b and the anti-rotation chamber 244 may be positioned at any desired circumferential location.

Figure 5:
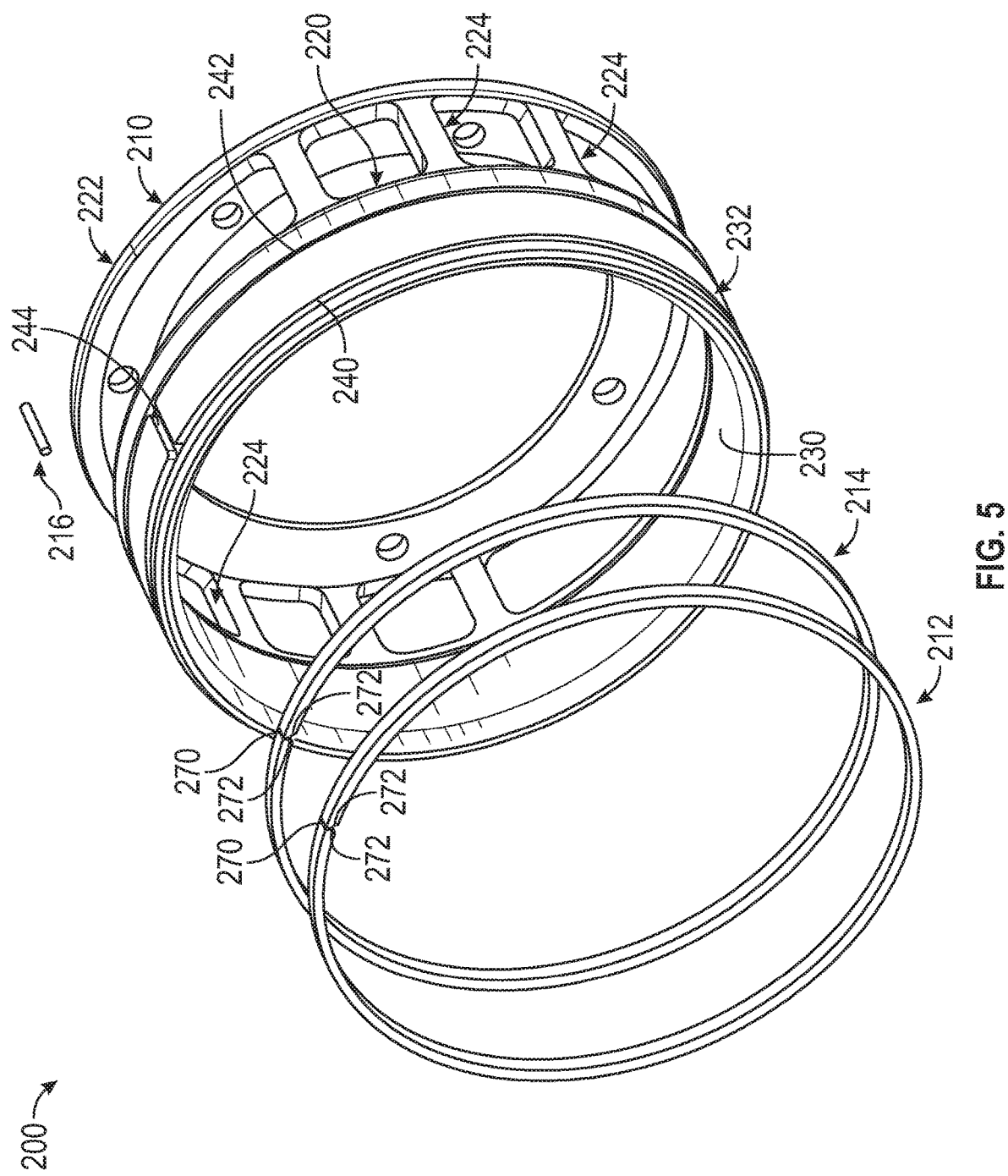
FIG. 5 is an exploded view of the squeeze film damper bearing assembly of FIG. 3, in which the inner ring of the bearing and the plurality of rolling elements are removed for clarity.
Figure 6:
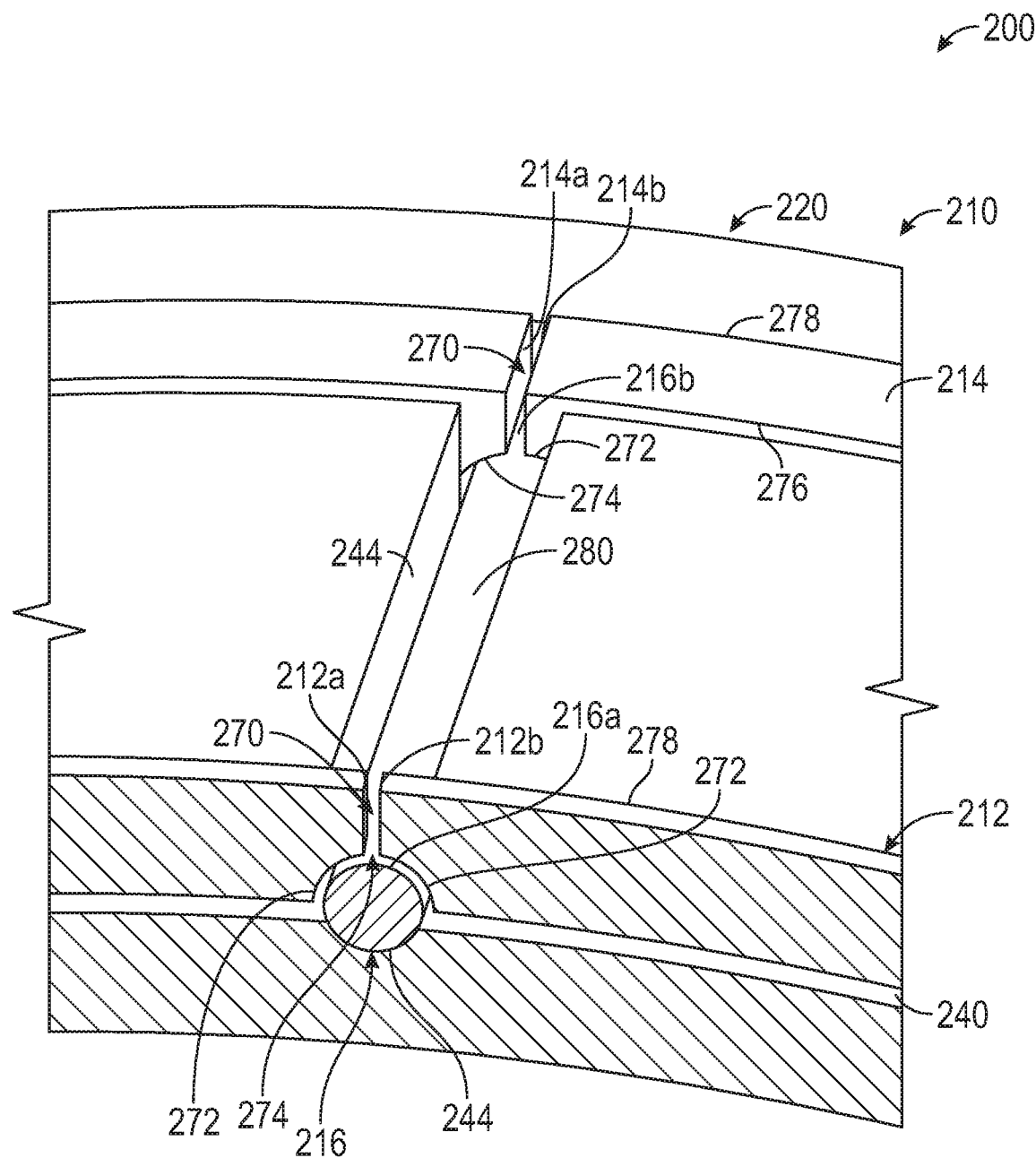
FIG. 6 is a cross-sectional view, taken at line 6-6 of FIG. 3, which illustrates the engagement of the anti-rotation member with the first piston ring and the second piston ring of the squeeze film damper bearing assembly.

The first piston ring 212 is received within the first channel 240, and the second piston ring 214 is received within the second channel 242. Each of the first piston ring 212 and the second piston ring 214 are composed of a metal or metal alloy, including, but not limited to corrosion resistant stainless steel, cast iron, etc. The first piston ring 212 and the second piston ring 214 may be cast, forged, stamped, machined, formed through additive manufacturing, etc. In this example, the first piston ring 212 is substantially similar or the same as the second piston ring 214. With reference to FIG. 5, an exploded view of the squeeze film damper bearing assembly 200 is shown with the inner ring 204 and the plurality of rolling elements 208 removed for clarity. The first piston ring 212 and the second piston ring 214 are annular, and are sized to be received within the first channel 240 and the second channel 242, respectively. Each of the first piston ring 212 and the second piston ring 214 include a split line 270 and at least one or a pair of notches 272. With reference to FIG. 6, a detail cross-sectional view of the first piston ring 212 engaged with the anti-rotation member 216 is shown, with the understanding that as the first piston ring 212 is the same as the second piston ring 214, the engagement of the second piston ring 214 with the anti-rotation member 216 is the same. The split line 270 is an axial groove that is defined through each of the first piston ring 212 and the second piston ring 214 to enable the first piston ring 212 and the second piston ring 214 to be positioned about the spring cage 210. Thus, the split line 270 creates opposed ends 212a, 212b; 214a, 214b for each of the first piston ring 212 and the second piston ring 214 to enable the first piston ring 212 and the second piston ring 214 to flex during coupling or installation of the first piston ring 212 and the second piston ring 214 about the spring cage 210.

The at least one or pair of notches 272 are defined at the opposed ends 212a, 212b; 214a, 214b of the first piston ring 212 and the second piston ring 214. In this example, the notches 272 cooperate to form a semi-circular shape 274 with the opposed ends 212a, 212b; 214a, 214b. The semi-circular shape 274 cooperates with the anti-rotation member 216 to inhibit the rotation of the first piston ring 212 and the second piston ring 214 relative to the spring cage 210. It should be noted that the notches 272 may cooperate to define any suitable shape at the opposed ends 212a, 212b; 214a, 214b of the first piston ring 212 and the second piston ring 214 to cooperate with the anti-rotation member 216 to inhibit the rotation of the first piston ring 212 and the second piston ring 214. Each of the notches 272 comprises a curved or arcuate recess, which cooperates with a surface 280 of the anti-rotation member 216. The notches 272 extend along the opposed ends 212a, 212b; 214a, 214b of each of the first piston ring 212 and the second piston ring 214, respectively, from a first side 276 to an opposite second side 278.

In one example, the at least one anti-rotation member 216 comprises a single anti-rotation member 216. In this example, the anti-rotation member 216 comprises a cylindrical pin, which is received axially within the anti-rotation chamber 244. The anti-rotation member 216 may be composed of a metal or metal alloy, including, but not limited to corrosion resistant stainless steel, etc. The anti-rotation member 216 may be cast, extruded, forged, rolled, formed through additive manufacturing, etc. It should be noted that other shapes may be used to cooperate with the first piston ring 212 and the second piston ring 214 to inhibit the rotation of the first piston ring 212 and the second piston ring 214, and thus, the cylindrical pin is merely an example. The anti-rotation member 216 includes the surface 280, which cooperates with the notches 272. The anti-rotation member 216 has a first member end 216a opposite a second member end 216b, and the surface 280 is defined about the anti-rotation member 216 from the first member end 216a to the second member end 216b. As shown in FIG. 4, the first member end 216a is coupled to or interfaces with the notches 272 of the first piston ring 212, while the second member end 216b is coupled to or interfaces with the notches 272 of the second piston ring 214.

In one example, with reference to FIG. 5, with the spring cage 210, the first piston ring 212, the second piston ring 214 and the anti-rotation member 216 formed, the anti-rotation member 216 is inserted into the anti-rotation chamber 244. The anti-rotation member 216 may be secured within the anti-rotation chamber 244 via epoxy, press fitting, etc., if desired. The first piston ring 212 is flexed to position the first piston ring 212 about the spring cage 210. The first piston ring 212 is positioned within the first channel 240 such that the notches 272 engage with the surface 280 (FIG. 6) of the anti-rotation member 216. The second piston ring 214 is flexed to position the second piston ring 214 about the spring cage 210. The second piston ring 214 is positioned within the second channel 242 such that the notches 272 engage with the surface 280 (FIG. 6) of the anti-rotation member 216. With reference to FIG. 2, the inner ring 204 and the plurality of rolling elements 208 are assembled within or coupled to the LP shaft 144 and the inner diameter surface 230 of the outer ring 220. The structure 238 is coupled between the spring cage 210 and the mounting structure 239. The mounting flange 222 may be coupled to the mounting structure 239 or the gas turbine engine 100 via mechanical fasteners coupled through the mounting holes 250 to couple the squeeze film damper bearing assembly 200 to the gas turbine engine 100.

As the LP shaft 144 rotates during the operation of the gas turbine engine 100, with reference to FIG. 2, the inner ring 204 and the outer ring 220 whirl with the LP shaft 144 creating relative motion between the outer ring 220 and the structure 238. The first piston ring 212 and the second piston ring 214 cooperate with the structure 238 to define a seal that maintains a pressurized film of the lubrication fluid, such as oil, within an intermediate portion 282 (FIG. 4) of the spring cage 210. As the LP shaft 144 rotates, with additional reference to FIG. 4, the anti-rotation member 216 cooperates with the notches 272 to inhibit the rotation of the first piston ring 212 and the second piston ring 214 relative to the first channel 240, second channel 242 and structure 238. This aids in retaining the lubrication fluid in the annulus bounded by an inner surface of structure 238, the second side 278 (FIG. 6) of the first piston ring 212, the first side 276 (FIG. 6) of the second piston ring 214, and the intermediate portion 282 of the outer diameter surface 232 during the rotation of the LP shaft 144. In one example, the lubrication fluid is supplied to the bounded annulus defined between the first piston ring 212 and the second piston ring 214 through at least one or a plurality of small diameter radial holes defined in the structure 238. Moreover, by inhibiting the rotation of the first piston ring 212 and the second piston ring 214, wear of mating surfaces is minimized. For example, the anti-rotation member 216 inhibits wear on any of the three sides of first channel 240 and the second channel 242, and also on the inner surface of the structure 238, thereby increasing longevity and ensuring proper operation of the squeeze film damper bearing assembly 200 and the gas turbine engine 100 in general.

Figure 7:
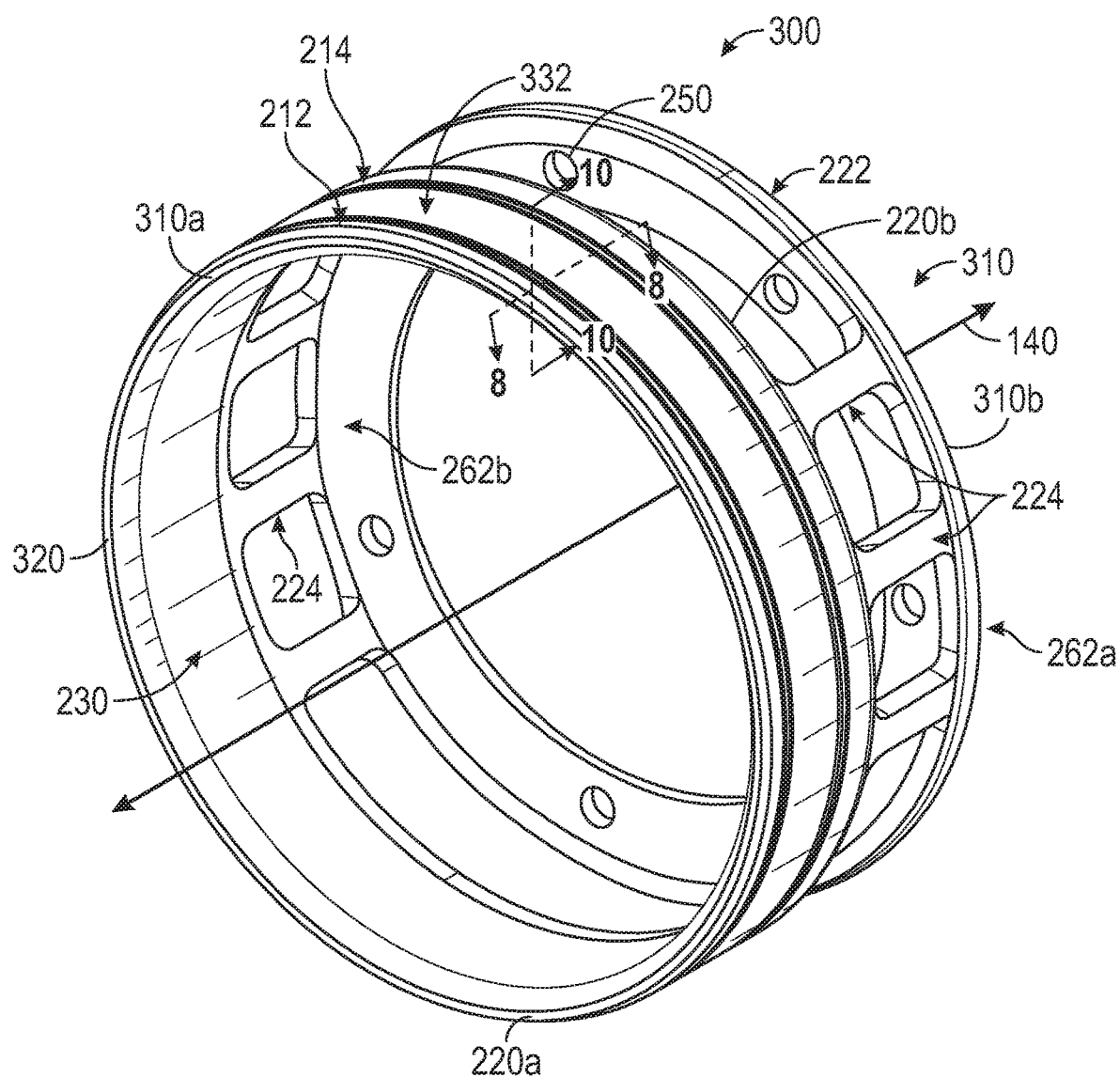
FIG. 7 is a perspective view of another exemplary squeeze film damper bearing assembly for use with the gas turbine engine of FIG. 1, in which an inner ring of the bearing and a plurality of rolling elements are removed for clarity.
Figure 9:
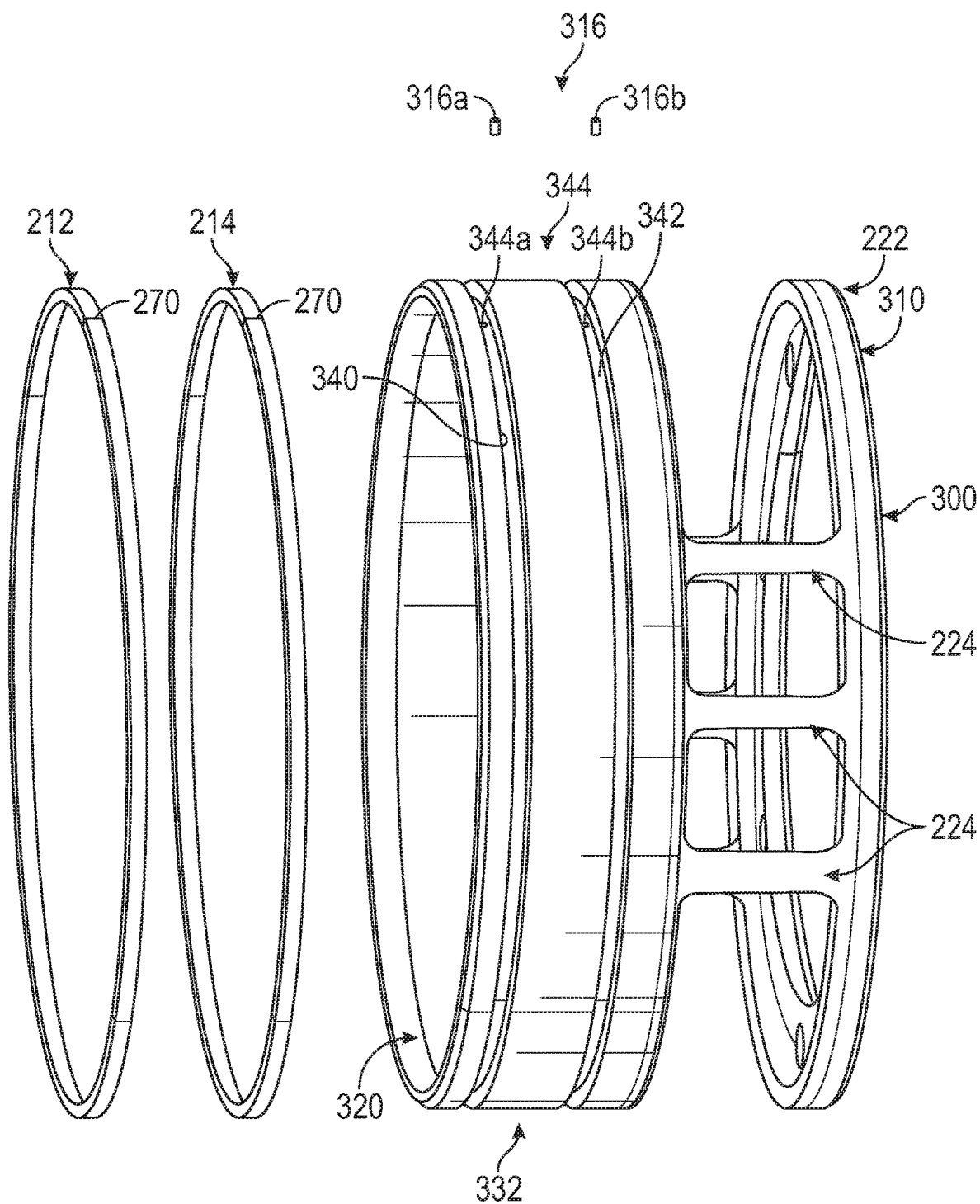
FIG. 9 is an exploded view of the squeeze film damper bearing assembly of FIG. 7, in which the inner ring of the bearing and the plurality of rolling elements are removed for clarity.

It should be noted that in other embodiments, the squeeze film damper bearing assembly 200 may be configured differently to support the rotation of a rotatable shaft associated with the gas turbine engine 100 (FIG. 1) such as the LP shaft 144 and/or the HP shaft 142 (FIG. 1). With reference to FIG. 7, a squeeze film damper bearing assembly 300 is shown. As the squeeze film damper bearing assembly 300 may include some of the same features as the squeeze film damper bearing assembly 200 discussed with regard to FIGS. 1-6, the same reference numerals will be used to denote the same features and as these features are the same they will not be discussed in detail herein. The squeeze film damper bearing assembly 300 is coaxial with the longitudinal axis 140 and extends along the longitudinal axis 140. In this example, the squeeze film damper bearing assembly 300 includes the bearing 202 (FIG. 2), a spring cage 310, the first piston ring 212, the second piston ring 214 and at least one anti-rotation member 316 (FIG. 9). In this example, the squeeze film damper bearing assembly 300 includes a pair of anti-rotation members 316a, 316b (FIG. 9). The bearing 202 (FIG. 2) includes the inner ring 204 (FIG. 2) and the plurality of rolling elements 208 (FIG. 2), which are removed for clarity in FIG. 7. It should be noted that the squeeze film damper bearing assembly 300 is shown with an outer ring 320 defined by the spring cage 310, however, it will be understood that the first piston ring 212, the second piston ring 214 and the pair of anti-rotation members 316a, 316b may also be used with the configuration in which bearing 202 includes the outer ring 220' as discussed with regard to FIG. 2A that is separate and discrete from the spring cage 310.

The spring cage 310 is annular, and surrounds the plurality of rolling elements 208 (FIG. 2) and the inner ring 204 (FIG. 2). The spring cage 310 is composed of a metal or metal alloy suitable for high cycle fatigue loading, including, but not limited to corrosion resistant stainless steel, titanium, etc. The spring cage 310 may be cast, forged, machined, formed through additive manufacturing, etc. The spring cage 310 includes the outer ring 320, the mounting flange 222 and the plurality of fingers 224 that couple or interconnect the outer ring 320 with the mounting flange 222. The outer ring 320 is defined at a first end 310a of the spring cage 310, and the mounting flange 222 is defined at an opposite second end 310b. The outer ring 320 is spaced axially apart from the mounting flange 222 along the longitudinal axis 140 by the fingers 224. The outer ring 320 includes the inner diameter surface 230 and an opposite outer diameter surface 332. The outer ring 320 also includes the first end 220a opposite the second end 220b.

The inner diameter surface 230 is substantially smooth, and cooperates with the inner ring 204 (FIG. 2) to retain the plurality of rolling elements 208 (FIG. 2). In one example, with reference to FIG. 8, a cross-sectional view of a portion of the squeeze film damper bearing assembly 300 is shown. The outer diameter surface 332 is positioned adjacent to the structure 238 (FIG. 2) of the gas turbine engine 100 (FIG. 2) to form a pressurized film of lubrication fluid, such as oil, between the squeeze film damper bearing assembly 300 and the structure 238. The outer diameter surface 332 defines a first circumferential or first channel 340, a second circumferential or second channel 342 and at least one anti-rotation chamber 344. The first channel 340 is axially spaced apart from the second channel 342, such that the first channel 340 is proximate the first end 220a, while the second channel 342 is proximate the second end 220b. The first channel 340 and the second channel 342 are substantially U-shaped, and are defined radially inward from the outer diameter surface 332 toward the inner diameter surface 230 such that each of the first channel 340 and the second channel 342 are recessed relative to the outer diameter surface 332. The first channel 340 and the second channel 342 each extend about a perimeter or circumference of the outer diameter surface 332, and in this example, are substantially continuous about the perimeter of the outer diameter surface 332. The first channel 340 and the second channel 342 are each configured to receive a respective one of the first piston ring 212 and the second piston ring 214. Generally, the first piston ring 212 and the second piston ring 214 are received within the first channel 340 and the second channel 342, respectively, such that the thickness T of the first piston ring 212 and the second piston ring 214 extends above the outer diameter surface 332 to contain the lubrication fluid, such as the oil, between the first piston ring 212 and the second piston ring 214. In this example, the first channel 340 and the second channel 342 are defined so as to be discrete about the perimeter of the spring cage 310, or stated another way, the first channel 340 and the second channel 342 are not in communication with one another.

In this example, the outer diameter surface 332 defines a pair of anti-rotation chambers 344a, 344b. In other embodiments, the outer diameter surface 332 may include multiple pairs of anti-rotation chambers 344a, 344b. In this example, the anti-rotation chambers 344a, 344b are each defined radially in a respective one of the first channel 340 and the second channel 342. The anti-rotation chambers 344a, 344b are each substantially cylindrical, but the anti-rotation chambers 344a, 344b may have any desired shape that cooperates with a shape of the respective anti-rotation member 316a, 316b. Each of the anti-rotation chambers 344a, 344b are the same, and each is defined within the respective one of the first channel 340 and the second channel 342 to receive the respective anti-rotation member 316a, 316b to inhibit a rotation of the first piston ring 212 and the second piston ring 214. The anti-rotation chambers 344a, 344b are each defined radially inward through the outer diameter surface 332 toward the inner diameter surface 230. Stated another way, the anti-rotation chambers 344a, 344b may be defined through the first channel 340 and the second channel 342, respectively, so as to extend partially below an innermost surface 340a, 342a, respectively, of the first channel 340 and the second channel 342. The anti-rotation chambers 344a, 344b each extend along an axis A1, which is substantially perpendicular to the longitudinal axis 140 (FIG. 1). The anti-rotation chambers 344a, 344b are substantially cylindrical to receive the respective anti-rotation member 316a, 316b. The anti-rotation chambers 344a, 344b may be defined with the forming of the spring cage 310, or may be formed by machining, electrical discharge machining, etc.

With reference back to FIG. 7, the mounting flange 222 couples the squeeze film damper bearing assembly 300 to the gas turbine engine 100 (FIG. 2). The fingers 224 interconnect the mounting flange 222 and the outer ring 320. Although not shown herein, generally, the groups 262a, 262b of fingers 224 are positioned at about the 3 o'clock position (between about 75 degrees to about 105 degrees of the circle defined by the perimeter of the mounting flange 222, with zero degrees at the 12 o'clock position, measured clockwise) and the 9 o'clock position (between about 255 degrees to about 285 degrees of the circle defined by the perimeter of the mounting flange 222) about the circumference of the spring cage 310 so as to be on opposed sides, and the anti-rotation chambers 344a, 344b are each defined at about the 12 o'clock position (between about 345 degrees to about 15 degrees). It should be noted, however, that the groups 262a, 262b and the anti-rotation chambers 344a, 344b may be positioned at any desired circumferential location.

Figure 8:
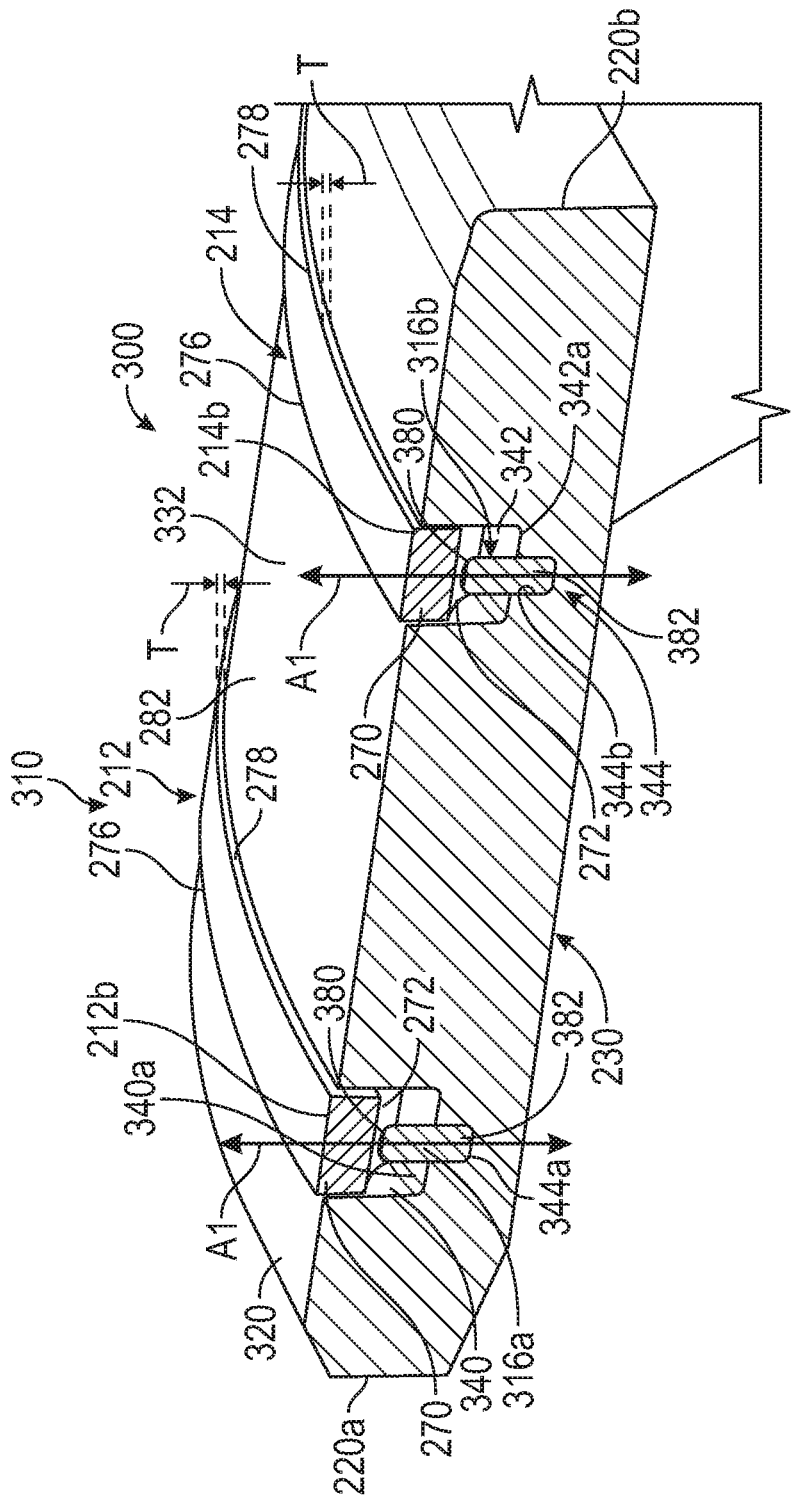
FIG. 8 is a cross-sectional view, taken at line 8-8 of FIG. 7, which illustrates the engagement of a pair of anti-rotation members with a first piston ring and a second piston ring, respectively, of the squeeze film damper bearing assembly.
Figure 10:
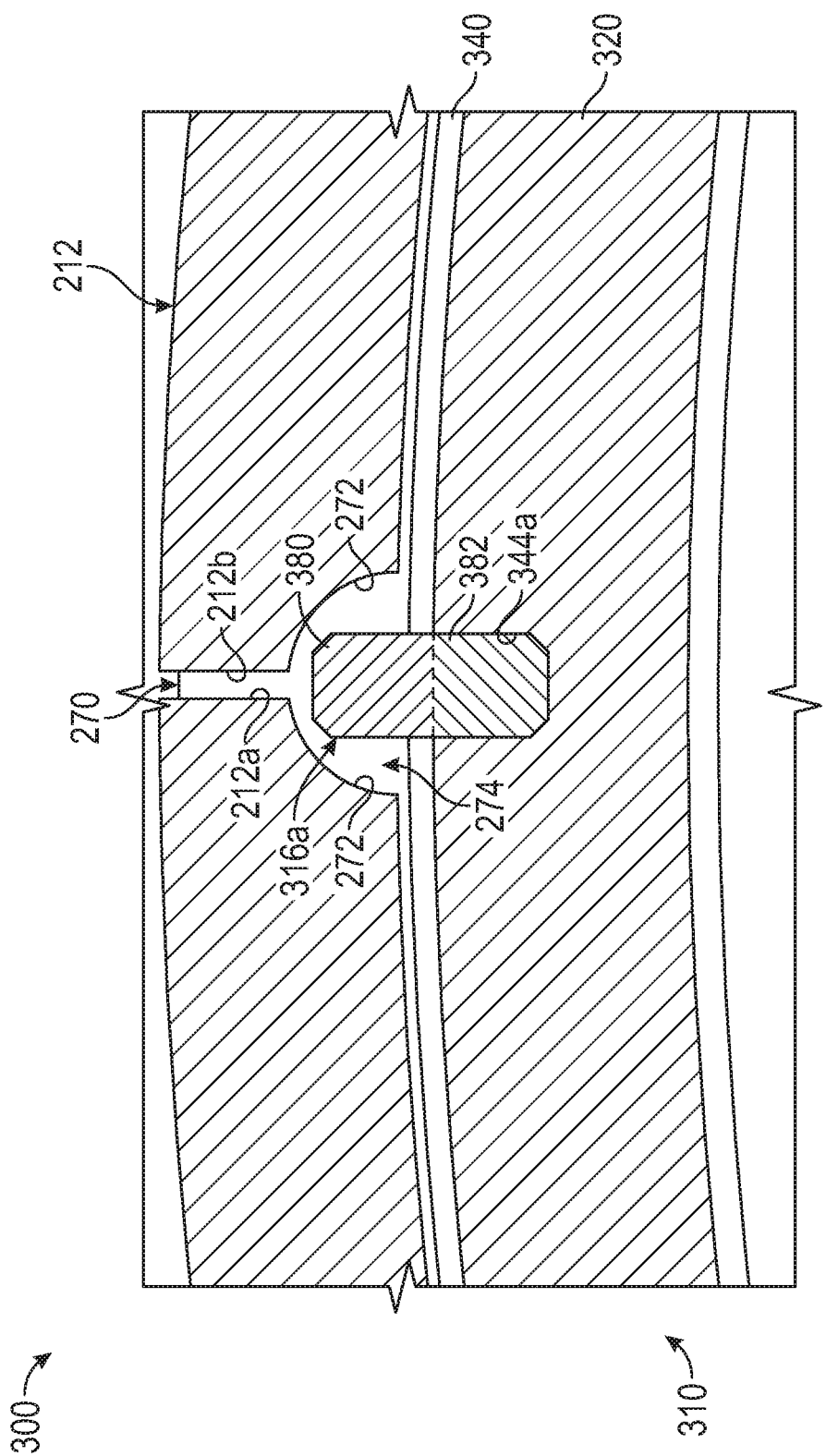
FIG. 10 is a cross-sectional view, taken at line 10-10 of FIG. 7, which illustrates the engagement of the anti-rotation member with the first piston ring and the second piston ring of the squeeze film damper bearing assembly.

The first piston ring 212 is received within the first channel 340, and the second piston ring 214 is received within the second channel 342. With reference to FIG. 9, an exploded view of the squeeze film damper bearing assembly 300 is shown with the inner ring 204 (FIG. 2) and the plurality of rolling elements 208 (FIG. 2) removed for clarity. The first piston ring 212 and the second piston ring 214 are annular, and are sized to be received within the first channel 340 and the second channel 342, respectively. Each of the first piston ring 212 and the second piston ring 214 include the split line 270 and the pair of notches 272 (FIG. 10). With reference to FIG. 10, a detail cross-sectional view of the first piston ring 212 engaged with the anti-rotation member 316a is shown, with the understanding that as the first piston ring 212 is the same as the second piston ring 214, the engagement of the second piston ring 214 with the anti-rotation member 316b is the same. The at least one or pair of notches 272 are defined at the opposed ends 212a, 212b; 214a, 214b of the first piston ring 212 and the second piston ring 214 (FIG. 7). In this example, the notches 272 cooperate to form a semi-circular shape 274 with the opposed ends 212a, 212b; 214a, 214b. The semi-circular shape 274 cooperates with the respective anti-rotation member 316a, 316b to inhibit the rotation of the first piston ring 212 and the second piston ring 214 relative to the spring cage 310, thereby inhibiting wear on any of the three sides of the first channel 340 (FIG. 9) and the second channel 342 (FIG. 9), and also on the inner surface of the structure 238 (FIG. 2). It should be noted that the notches 272 may cooperate to define any suitable shape at the opposed ends 212a, 212b; 214a, 214b of the first piston ring 212 and the second piston ring 214 to cooperate with the respective anti-rotation member 316a, 316b to inhibit the rotation of the first piston ring 212 and the second piston ring 214. With reference to FIG. 8, each of the notches 272 comprises a curved or arcuate recess, which cooperates with a first member end 380 of the respective anti-rotation member 316a, 316b. The notches 272 extend along the opposed ends 212a, 212b; 214a, 214b of each of the first piston ring 212 and the second piston ring 214, respectively, from the first side 276 to the opposite second side 278.

In this example, the anti-rotation members 316a, 316b each comprise a cylindrical pin, which is received radially within the respective anti-rotation chamber 344a, 344b. The anti-rotation members 316a, 316b may be composed of a metal or metal alloy, including, but not limited to corrosion resistant stainless steel, etc. The anti-rotation members 316a, 316b may be cast, extruded, forged, rolled, formed through additive manufacturing, etc. It should be noted that other shapes may be used to cooperate with the first piston ring 212 and the second piston ring 214 to inhibit the rotation of the first piston ring 212 and the second piston ring 214, and thus, the cylindrical pins are merely an example. Each of the anti-rotation members 316a, 316b include the first member end 380, which cooperates with the notches 272. Generally, the anti-rotation members 316a, 316b each have the first member end 380 opposite a second member end 382. As shown in FIG. 8, the first member end 380 of each of the anti-rotation members 316a, 316b is coupled to or interfaces with the notches 272 of the first piston ring 212 and the second piston ring 214, respectively, while the second member end 382 is coupled to the anti-rotation chamber 344a, 344b of the first channel 340 and the second channel 342, respectively.

In one example, with reference to FIG. 9, with the spring cage 310, the first piston ring 212, the second piston ring 214 and the anti-rotation members 316a, 316b formed, the anti-rotation members 316a, 316b are each inserted into the respective anti-rotation chamber 344a, 344b. The anti-rotation members 316a, 316b may be secured within the respective anti-rotation chamber 344a, 344b via epoxy, press fitting, etc. The first piston ring 212 is flexed to position the first piston ring 212 about the spring cage 310. The first piston ring 212 is positioned within the first channel 340 such that the notches 272 engage with the first member end 380 of the anti-rotation member 316a (FIG. 10). The second piston ring 214 is flexed to position the second piston ring 214 about the spring cage 310. The second piston ring 214 is positioned within the second channel 342 such that the notches 272 engage with the first member end 380 of the anti-rotation member 316b (FIG. 8). The inner ring 204 (FIG. 2) and the plurality of rolling elements 208 (FIG. 2) are assembled within or coupled to the LP shaft 144 and the inner diameter surface 230 of the outer ring 320. The structure 238 (FIG. 2) is coupled between the spring cage 310 and the mounting structure 239. The mounting flange 222 may be coupled to the mounting structure 239 (FIG. 2) or the gas turbine engine 100 (FIG. 1) via mechanical fasteners coupled through the mounting holes 250 (FIG. 7) to couple the squeeze film damper bearing assembly 300 to the gas turbine engine 100 (FIG. 2).

As the LP shaft 144 (FIG. 2) rotates during the operation of the gas turbine engine 100 (FIG. 1), with reference to FIG. 8, the inner ring 204 (FIG. 2) and the outer ring 320 whirl with the LP shaft 144 (FIG. 2) creating relative motion between the outer ring 320 and the structure 238. The first piston ring 212 and the second piston ring 214 cooperate with the structure 238 (FIG. 2) to define a seal that maintains a pressurized film of the lubrication fluid, such as oil, within the intermediate portion 282 of the spring cage 310. As the LP shaft 144 rotates, the anti-rotation members 316a, 316b cooperate with the notches 272 to inhibit the rotation of the first piston ring 212 and the second piston ring 214 relative to the first channel 340, the second channel 342 and the structure 238. This aids in retaining the lubrication fluid in the annulus bounded by an inner surface of the structure 238, the second side 278 of the first piston ring 212, the first side 276 of the second piston ring 214 and the intermediate portion 282 of the outer diameter surface 332 during the rotation of the LP shaft 144 (FIG. 2). Moreover, by inhibiting the rotation of the first piston ring 212 and the second piston ring 214, wear of the mating surfaces is minimized. For example, the anti-rotation members 316a, 316b inhibit wear on any of the three sides of first channel 340 and the second channel 342, and also on the inner surface of the structure 238, thereby increasing longevity and ensuring proper operation of the squeeze film damper bearing assembly 300 and the gas turbine engine 100 (FIG. 1) in general.

Figure 11:
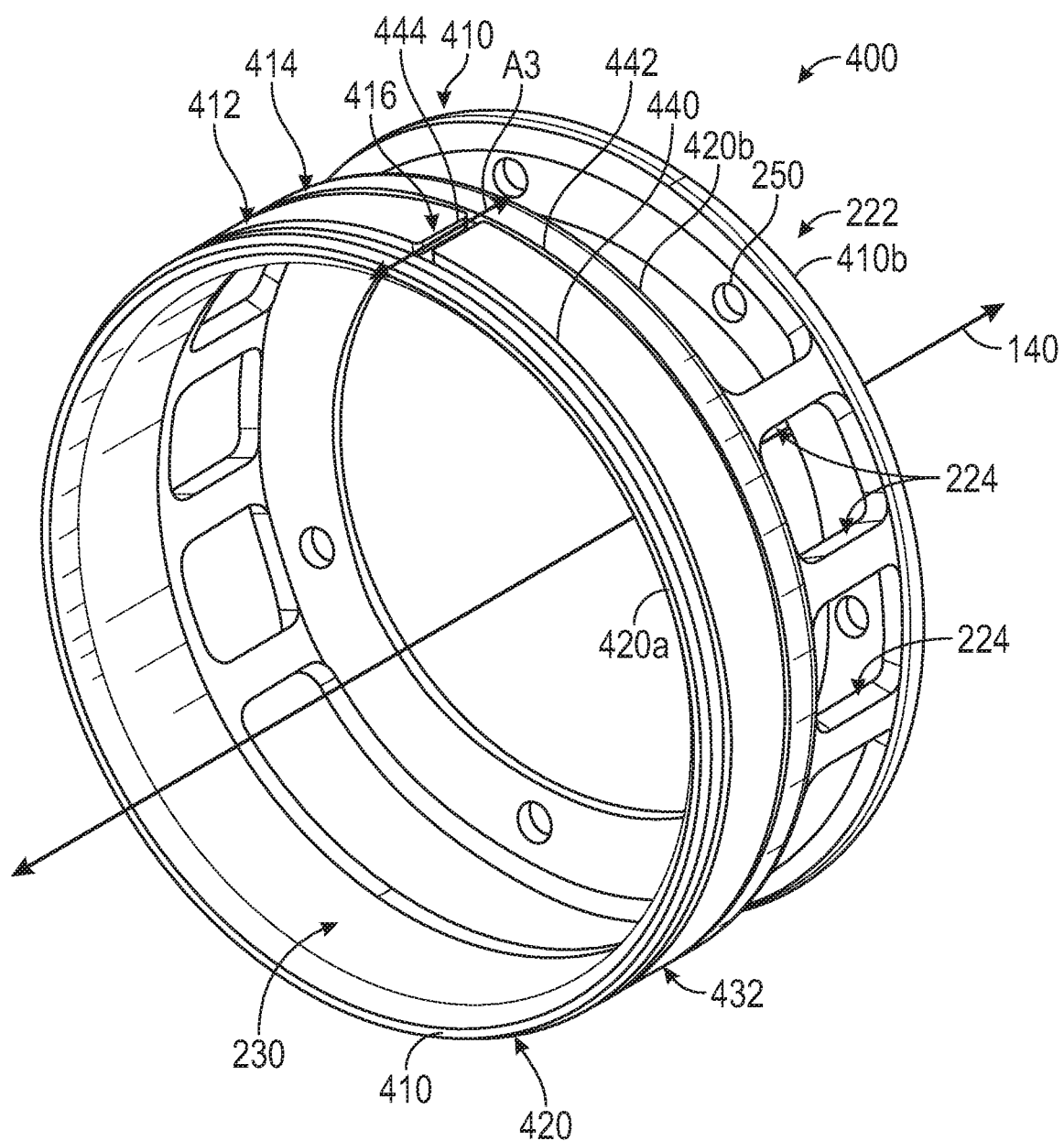
FIG. 11 is a perspective view of another exemplary squeeze film damper bearing assembly for use with the gas turbine engine of FIG. 1, in which an inner ring of the bearing and a plurality of rolling elements are removed for clarity.

It should be noted that in other embodiments, the squeeze film damper bearing assembly 200 may be configured differently to support the rotation of a rotatable shaft associated with the gas turbine engine 100 (FIG. 1) such as the LP shaft 144 and/or the HP shaft 142 (FIG. 1). With reference to FIG. 11, a squeeze film damper bearing assembly 400 is shown. As the squeeze film damper bearing assembly 400 may include some of the same features as the squeeze film damper bearing assembly 200 discussed with regard to FIGS. 1-6, the same reference numerals will be used to denote the same features and as these features are the same they will not be discussed in detail herein. The squeeze film damper bearing assembly 400 is coaxial with the longitudinal axis 140 and extends along the longitudinal axis 140. In this example, the squeeze film damper bearing assembly 400 includes the bearing 202 (FIG. 2), a spring cage 410, a first piston ring 412, a second piston ring 414 and at least one anti-rotation member 416. The bearing 202 (FIG. 2) includes the inner ring 204 (FIG. 2) and the plurality of rolling elements 208 (FIG. 2), which are removed for clarity in FIG. 11. It should be noted that the squeeze film damper bearing assembly 400 is shown with an outer ring 420 defined by the spring cage 410, however, it will be understood that the first piston ring 412, the second piston ring 414 and the at least one anti-rotation member 416 may also be used with the configuration in which bearing 202 includes the outer ring 220' as discussed with regard to FIG. 2A that is separate and discrete from the spring cage 410.

The spring cage 410 is annular, and surrounds the plurality of rolling elements 208 (FIG. 2) and the inner ring 204 (FIG. 2). The spring cage 410 is composed of a metal or metal alloy suitable for high cycle fatigue loading, including, but not limited to corrosion resistant stainless steel, titanium, etc. The spring cage 410 may be cast, forged, machined, formed through additive manufacturing, etc. The spring cage 410 includes the outer ring 420, the mounting flange 222 and the plurality of fingers 224 that couple or interconnect the outer ring 420 with the mounting flange 222. The outer ring 420 is defined at a first end 410a of the spring cage 410, and the mounting flange 222 is defined at an opposite second end 410b. The outer ring 420 is spaced axially apart from the mounting flange 222 along the longitudinal axis 140 by the fingers 224. The outer ring 420 includes the inner diameter surface 230 and an opposite outer diameter surface 432. The outer ring 420 also includes a first end 420a opposite a second end 420b. The first end 420a of the outer ring 420 defines the first end 410a of the spring cage 410, while the second end 420b is coupled to the plurality of fingers 224.

Figure 12:
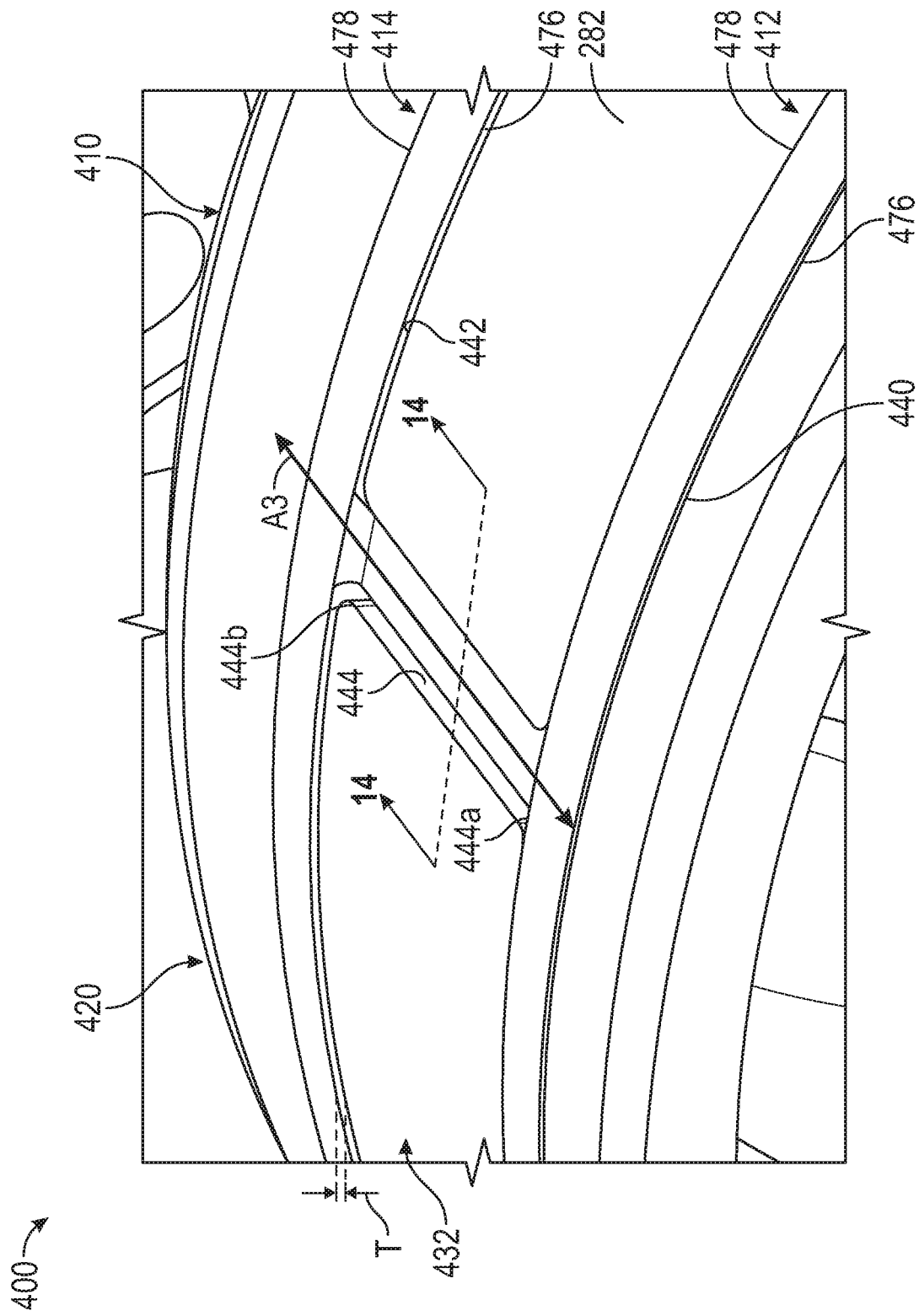
FIG. 12 is a detail view, which illustrates the engagement of an anti-rotation member associated with a first piston ring and a second piston ring engaged with an anti-rotation chamber of a spring cage of the squeeze film damper bearing assembly.

The inner diameter surface 230 is substantially smooth, and cooperates with the inner ring 204 (FIG. 2) to retain the plurality of rolling elements 208 (FIG. 2). The outer diameter surface 432 is positioned adjacent to the structure 238 (FIG. 2) of the gas turbine engine 100 (FIG. 2) to form a pressurized film of lubrication fluid, such as oil, between the squeeze film damper bearing assembly 400 and the structure 238. The outer diameter surface 432 defines a first circumferential or first channel 440, a second circumferential or second channel 442 and at least one anti-rotation chamber 444. The first channel 440 is axially spaced apart from the second channel 442, such that the first channel 440 is proximate the first end 420a, while the second channel 442 is proximate the second end 420b. The first channel 440 and the second channel 442 are substantially U-shaped, and are defined radially inward from the outer diameter surface 432 toward the inner diameter surface 230 such that each of the first channel 440 and the second channel 442 are recessed relative to the outer diameter surface 432. The first channel 440 and the second channel 442 each extend about a perimeter or circumference of the outer diameter surface 432, and in this example, are substantially continuous about the perimeter of the outer diameter surface 432. The first channel 440 and the second channel 442 are each configured to receive a respective one of the first piston ring 412 and the second piston ring 414. Generally, with reference to FIG. 12, the first piston ring 412 and the second piston ring 414 are received within the first channel 440 and the second channel 442, respectively, such that a thickness T of the first piston ring 412 and the second piston ring 414 extends above the outer diameter surface 432 to contain the lubrication fluid, such as the oil, between the first piston ring 412 and the second piston ring 414. The first channel 440 and the second channel 442 are interconnected by the anti-rotation chamber 444 such that the first channel 440 and the second channel 442 are in communication via the anti-rotation chamber 444.

Figure 13:
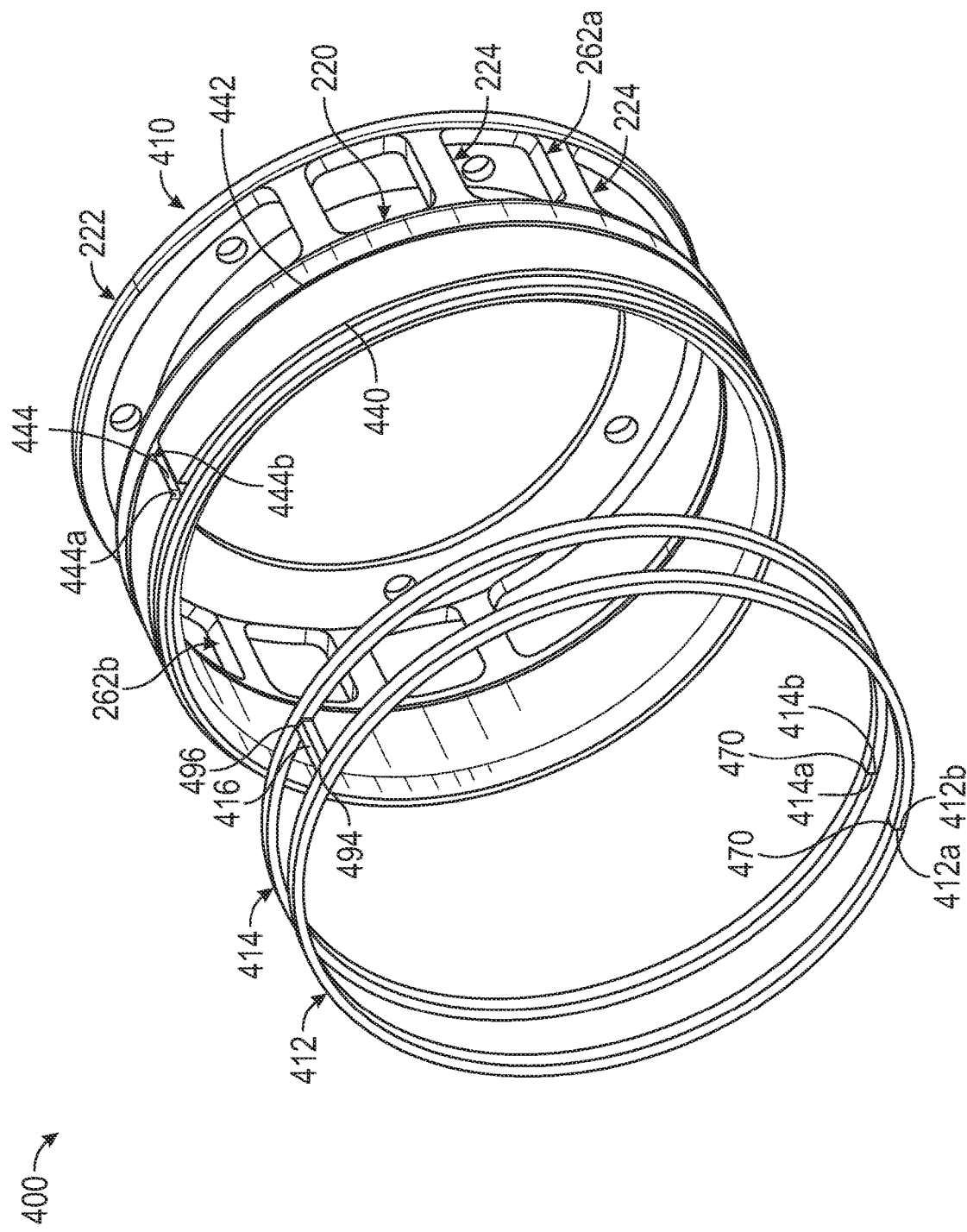
FIG. 13 is an exploded view of the squeeze film damper bearing assembly of FIG. 11, in which the inner ring of the bearing and the plurality of rolling elements are removed for clarity.

In this example, the outer diameter surface 432 defines a single anti-rotation chamber 444. In other embodiments, the outer diameter surface 432 may include a plurality of anti-rotation chambers 444. In this example, the anti-rotation chamber 444 is defined axially between the first channel 440 and the second channel 442. The anti-rotation chamber 444 extends between the first channel 440 and the second channel 442 to receive the anti-rotation member 416 to inhibit a rotation of the first piston ring 412 and the second piston ring 414. The anti-rotation chamber 444 is defined radially inward through the outer diameter surface 432 toward the inner diameter surface 230 and extends between the first channel 440 and the second channel 442. The anti-rotation chamber 444 extends along an axis A3, which is substantially parallel to the longitudinal axis 140 (FIG. 11). With reference to FIG. 13, the anti-rotation chamber 444 has a first chamber end 444*a* opposite a second chamber end 444*b*. The first chamber end 444*a* is in communication with the first channel 440, and the second chamber end 444*b* is in communication with the second channel 442. The anti-rotation chamber 444 is substantially U-shaped, but the anti-rotation chamber 444 may have any desired shape that cooperates with a shape of the anti-rotation member 416. In one example, with brief reference to FIG. 14, the anti-rotation chamber 444 may be defined with the U-shaped cross-section to cooperate with a shape of the anti-rotation member 416. The anti-rotation chamber 444 may be defined with the forming of the spring cage 410, or may be formed by machining, electrical discharge machining, etc.

With reference back to FIG. 11, the mounting flange 222 couples the squeeze film damper bearing assembly 400 to the gas turbine engine 100 (FIG. 2). The fingers 224 interconnect the mounting flange 222 and the outer ring 420. With reference to FIG. 13, generally, the groups 262*a*, 262*b* of fingers 224 are positioned at about the 3 o'clock position (between about 75 degrees to about 105 degrees of the circle defined by the perimeter of the mounting flange 222, with zero degrees at the 12 o'clock position, measured clockwise) and the 9 o'clock position (between about 255 degrees to about 285 degrees of the circle defined by the perimeter of the mounting flange 222) about the circumference of the spring cage 410 so as to be on opposed sides, and the anti-rotation chamber 444 is defined at about the 12 o'clock position (between about 345 degrees to about 15 degrees). Thus, the anti-rotation chamber 444 is defined so as to be circumferentially offset from the groups 262*a*, 262*b*. It should be noted, however, that the groups 262*a*, 262*b* and the anti-rotation chamber 444 may be positioned at any desired circumferential location.

The first piston ring 412 is received within the first channel 440, and the second piston ring 414 is received within the second channel 442. Each of the first piston ring 412 and the second piston ring 414 are composed of a metal or metal alloy, including, but not limited to corrosion resistant stainless steel, cast iron, etc. The first piston ring 412 and the second piston ring 414 may be cast, forged, stamped, machined, formed through additive manufacturing, etc. In this example, the first piston ring 412 is substantially similar or the same as the second piston ring 414. With reference to FIG. 13, an exploded view of the squeeze film damper bearing assembly 400 is shown with the inner ring 204 (FIG. 2) and the plurality of rolling elements 208 (FIG. 2) removed for clarity. The first piston ring 412 and the second piston ring 414 are annular, and are sized to be received within the first channel 440 and the second channel 442, respectively. Each of the first piston ring 412 and the second piston ring 414 include a split line 470 and are coupled to the anti-rotation member 416. The split line 470 is an axial groove that is defined through each of the first piston ring 412 and the second piston ring 414 to enable the first piston ring 412 and the second piston ring 414 to be positioned about the spring cage 410. Thus, the split line 470 creates opposed ends 412*a*, 412*b*; 414*a*, 414*b* for each of the first piston ring 412 and the second piston ring 414 to enable the first piston ring 412 and the second piston ring 414 to flex during coupling or installation of the first piston ring 412 and the second piston ring 414 about the spring cage 410. Generally, the anti-rotation member 416 is coupled to the first piston ring 412 and the second piston ring 414 so as to be circumferentially opposite of the split lines 470, and thus, the opposed ends 412*a*, 412*b*; 414*a*, 414*b*.

In this example, the at least one anti-rotation member 416 comprises a single anti-rotation member 416, which is coupled or integrally formed with the first piston ring 412 and the second piston ring 414. The anti-rotation member 416 may be composed of a metal or metal alloy, including, but not limited to corrosion resistant stainless steel, etc. The anti-rotation member 416 may be integrally formed with the first piston ring 412 and the second piston ring 414, or may be formed discretely and coupled to the first piston ring 412 and the second piston ring 414 via brazing or welding, for example. In this example, the anti-rotation member 416 comprises an axial rectangular bar, which is received axially within the anti-rotation chamber 444. It should be noted that other shapes may be used to cooperate with the anti-rotation chamber 444 to inhibit the rotation of the first piston ring 412 and the second piston ring 414, and thus, the rectangular bar is merely an example.

Figure 14:
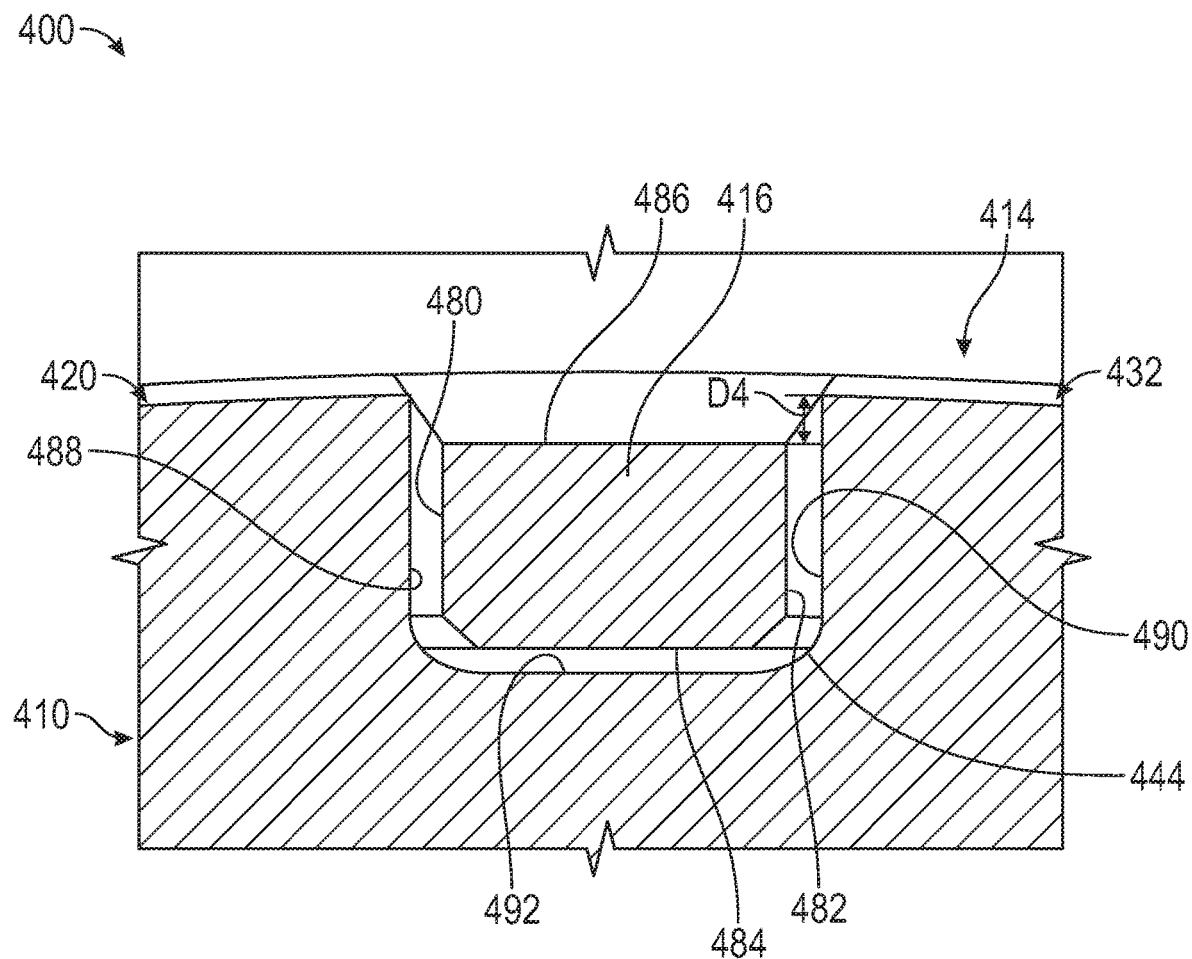
FIG. 14 is a cross-sectional view, taken at line 14-14 of FIG. 12, which illustrates the engagement of the anti-rotation member with the anti-rotation chamber.

With reference to FIG. 14, the anti-rotation member 416 includes a first sidewall 480 opposite a second sidewall 482 and a third sidewall 484 opposite a fourth sidewall 486. The first sidewall 480 is adjacent to a wall 488 of the anti-rotation chamber 444 when the anti-rotation member 416 is positioned within the anti-rotation chamber 444. The first sidewall 480 is configured to contact the wall 488 to inhibit a movement or rotation of the first piston ring 412 and the second piston ring 414. The second sidewall 482 is adjacent to a second wall 490 of the anti-rotation chamber 444 when the anti-rotation member 416 is positioned within the anti-rotation chamber 444. The second sidewall 482 is configured to contact the second wall 490 to inhibit a movement or rotation of the first piston ring 412 and the second piston ring 414. The third sidewall 484 is adjacent to and may be in contact with a bottom or third wall 492 of the anti-rotation chamber 444 when the anti-rotation member 416 is positioned within the anti-rotation chamber 444. The fourth sidewall 486 forms a top surface of the anti-rotation member 416, and in one example, the anti-rotation member 416 is coupled to the first piston ring 412 and the second piston ring 414 so as to sit below the outer diameter surface 432 of the spring cage 410. In this example, the fourth sidewall 486 is positioned a distance D4 below the outer diameter surface 432. In one example, D4 is about 0.005 inches (in.) to about 0.015 inches (in.). By positioning the anti-rotation member 416 below the outer diameter surface 432, the anti-rotation member 416 does not interfere with the formation of the seal against the structure 238 (FIG. 2) by the first piston ring 412 and the second piston ring 414. With reference back to FIG. 13, the anti-rotation member 416 also has a first member end 494 opposite a second member end 496. The first member end 494 is coupled to or integrally formed with the first piston ring 412 and the second member end 496 is coupled to or integrally formed with the second piston ring 414.

In one example, with reference to FIG. 11, with the spring cage 410, the first piston ring 412, the second piston ring 414 and the anti-rotation member 416 formed and coupled to the first piston ring 412 and the second piston ring 414, the first piston ring 412 and the second piston ring 414 are flexed to position the first piston ring 412 and the second piston ring 414 about the spring cage 410. The first piston ring 412 is positioned within the first channel 440 and the second piston ring 414 is positioned in the second channel 442 such that the anti-rotation member 416 is received within the anti-rotation chamber 444. The inner ring 204 (FIG. 2) and the plurality of rolling elements 208 (FIG. 2) are assembled within or coupled to the LP shaft 144 (FIG. 2) and to the inner diameter surface 230 of the outer ring 420. The structure 238 (FIG. 2) is coupled between the spring cage 410 and the mounting structure 239 (FIG. 2). The mounting flange 222 may be coupled to the mounting structure 239 (FIG. 2) or the gas turbine engine 100 (FIG. 2) via mechanical fasteners coupled through the mounting holes 250 to couple the squeeze film damper bearing assembly 400 to the gas turbine engine 100 (FIG. 2).

As the LP shaft 144 (FIG. 2) rotates during the operation of the gas turbine engine 100 (FIG. 2), with reference to FIG. 14, the inner ring 204 (FIG. 2) and the outer ring 420 whirl with the LP shaft 144 (FIG. 2) creating relative motion between the outer ring 420 and the structure 238 (FIG. 2). The first piston ring 412 and the second piston ring 414 cooperate with the structure 238 (FIG. 2) to define a seal that maintains a film of the lubrication fluid, such as oil, within the intermediate portion 282 (FIG. 12) of the spring cage 410. As the LP shaft 144 (FIG. 2) rotates, the anti-rotation member 416 cooperates with the walls 488, 490 to inhibit the rotation of the first piston ring 412 and the second piston ring 414 relative to the first channel 440, the second channel 442 and the structure 238 (FIG. 2). This aids in retaining the lubrication fluid in the annulus bounded by the inner surface of the structure 238 (FIG. 2), the second side 478 of the first piston ring 412, the first side 476 of the second piston ring 414 and the intermediate portion 282 of the outer diameter surface 432 during the rotation of the LP shaft 144 (FIG. 2). Moreover, by inhibiting the rotation of the first piston ring 412 and the second piston ring 414, wear of the mating surfaces is minimized. For example, the anti-rotation member 416 inhibits wear on any of the three sides of first channel 440 and the second channel 442, and also on the inner surface of the structure 238 (FIG. 2), thereby increasing longevity and ensuring proper operation of the squeeze film damper bearing assembly 400 and the gas turbine engine 100 (FIG. 2) in general.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A squeeze film damper bearing assembly, comprising:
a bearing;
a spring cage that receives and surrounds the bearing, the spring cage having an inner diameter and an opposite outer diameter, the bearing adjacent to the inner diameter, the outer diameter having an outer surface that defines a first circumferential channel recessed within the outer surface that is axially spaced apart from a second circumferential channel recessed within the outer surface and at least one axial anti-rotation chamber that interconnects the first channel and the second channel;
a first piston ring received in the first channel;
a second piston ring received in the second channel; and
at least one anti-rotation member received within the at least one axial anti-rotation chamber that cooperates with the first piston ring and the second piston ring to inhibit a rotation of the first piston ring and the second piston ring relative to the outer surface.

2. The squeeze film damper bearing assembly of claim 1, wherein the at least one anti-rotation member is a pin received within the at least one axial anti-rotation chamber that cooperates with at least one notch defined in each of the first piston ring and the second piston ring to inhibit the rotation of the first piston ring and the second piston ring relative to the outer surface.

3. The squeeze film damper bearing assembly of claim 2, wherein the first piston ring includes a split line that defines opposed ends of the first piston ring, and the at least one notch comprises a pair of notches, each defined at a respective one of the opposed ends.

4. The squeeze film damper bearing assembly of claim 1, wherein a portion of the anti-rotation chamber is defined beneath a surface of each of the first circumferential channel and the second circumferential channel.

5. The squeeze film damper bearing assembly of claim 1, wherein the squeeze film damper bearing assembly extends along a longitudinal axis and the at least one axial anti-rotation chamber is parallel to the longitudinal axis.

6. The squeeze film damper bearing assembly of claim 1, wherein the bearing further comprises an outer ring, and a mounting flange coupled to the outer ring by a plurality of fingers.

7. The squeeze film damper bearing assembly of claim 6, wherein the plurality of fingers is arranged in at least one group, and the at least one axial anti-rotation chamber is defined so as to be circumferentially offset from the at least one group.

8. The squeeze film damper bearing assembly of claim 1, wherein the at least one anti-rotation member is an axial bar coupled to the first piston ring and the second piston ring that is received within the at least one axial anti-rotation chamber to inhibit the rotation of the first piston ring and the second piston ring relative to the outer surface.

9. The squeeze film damper bearing assembly of claim 8, wherein the axial bar is received within the at least one axial anti-rotation chamber so as to be positioned a distance below the outer surface.

10. The squeeze film damper bearing assembly of claim 8, wherein the first piston ring and the second piston ring each include a split line that defines opposed ends of the first piston ring and the second piston ring, and the axial bar is coupled to the first piston ring and the second piston ring so as to be circumferentially opposite of the opposed ends.

11. A squeeze film damper bearing assembly comprising:
a bearing;
a spring cage that receives and surrounds the bearing, the spring cage having an inner diameter and an opposite outer diameter, the bearing coupled to the inner diameter, the outer diameter having an outer surface that defines a first circumferential channel recessed within the outer surface that is axially spaced apart from a second circumferential channel recessed within the outer surface and a first radial anti-rotation chamber defined in the first channel;
a first piston ring received in the first channel, the first piston ring having a first notch defined to face the first channel;
a second piston ring received in the second channel; and
at least one anti-rotation member received within the first radial anti-rotation chamber that cooperates with the first notch to inhibit a rotation of the first piston ring relative to the outer surface.

12. The squeeze film damper bearing assembly of claim 11, wherein the at least one anti-rotation member is a first pin received within the first radial anti-rotation chamber.

13. The squeeze film damper bearing assembly of claim 12, further comprising a second radial anti-rotation chamber defined in the second channel and a second notch defined in the second piston ring to face the second channel, and the at least one anti-rotation member further comprises a second pin received within the second radial anti-rotation chamber that cooperates with the second notch to inhibit the rotation of the second piston ring relative to the outer surface.

14. The squeeze film damper bearing assembly of claim 13, wherein the first piston ring and the second piston ring each include a split line that defines opposed ends of the first piston ring and the second piston ring, and the first notch and the second notch comprises a pair of notches, each defined at a respective one of the opposed ends.

15. The squeeze film damper bearing assembly of claim 11, wherein a portion of the first radial anti-rotation chamber is defined beneath a surface of the first circumferential channel.

16. The squeeze film damper bearing assembly of claim 11, wherein the squeeze film damper bearing assembly extends along a longitudinal axis and the first radial anti-rotation chamber is perpendicular to the longitudinal axis.

17. A squeeze film damper bearing assembly, comprising:
a bearing;
a spring cage that receives and surrounds the bearing, the spring cage having an inner diameter and an opposite outer diameter, the bearing coupled to the inner diameter, the outer diameter having an outer surface that defines a first circumferential channel recessed within the outer surface that is axially spaced apart from a second circumferential channel recessed within the outer surface and at least one axial anti-rotation chamber that interconnects the first channel and the second channel;
a first piston ring received in the first channel;
a second piston ring received in the second channel;
at least one anti-rotation member received within the at least one axial anti-rotation chamber that cooperates with the first piston ring and the second piston ring to inhibit a rotation of the first piston ring and the second piston ring relative to the outer surface; and
a mounting flange coupled to the spring cage by a plurality of fingers, and the plurality of fingers is arranged in at least one group, with the at least one axial anti-rotation chamber defined so as to be circumferentially offset from the at least one group,
wherein the squeeze film damper bearing assembly extends along a longitudinal axis and the at least one axial anti-rotation chamber is parallel to the longitudinal axis.

18. The squeeze film damper bearing assembly of claim 17, wherein the at least one anti-rotation member is a pin received within the at least one axial anti-rotation chamber that cooperates with at least one notch defined in each of the first piston ring and the second piston ring to inhibit the rotation of the first piston ring and the second piston ring relative to the outer surface.

19. The squeeze film damper bearing assembly of claim 18, wherein the first piston ring includes a split line that defines opposed ends of the first piston ring, and the at least one notch comprises a pair of notches, each defined at a respective one of the opposed ends.

20. The squeeze film damper bearing assembly of claim 17, wherein the at least one anti-rotation member is an axial bar coupled to the first piston ring and the second piston ring that is received within the at least one axial anti-rotation chamber to inhibit the rotation of the first piston ring and the second piston ring relative to the outer surface.

* * * * *